United States Patent
Berger et al.

(10) Patent No.: US 12,444,014 B2
(45) Date of Patent: Oct. 14, 2025

(54) MULTI-DIRECTIONAL ROLLING CACHE AND METHODS THEREFOR

(71) Applicant: Intel Corporation, Santa Clara, CA (US)

(72) Inventors: Guy Berger, Givat Shmuel (IL); Itai Ostashinsky, Haifa (IL); Rakefet Kol, Haifa (IL)

(73) Assignee: Intel Corporation, Santa Clara, CA (US)

( * ) Notice: Subject to any disclaimer, the term of this patent is extended or adjusted under 35 U.S.C. 154(b) by 591 days.

(21) Appl. No.: 17/709,988

(22) Filed: Mar. 31, 2022

(65) Prior Publication Data

US 2022/0222771 A1    Jul. 14, 2022

(51) Int. Cl.
G06T 1/60 (2006.01)
G06T 11/40 (2006.01)
G06T 11/60 (2006.01)

(52) U.S. Cl.
CPC ............... G06T 1/60 (2013.01); G06T 11/40 (2013.01); G06T 11/60 (2013.01)

(58) Field of Classification Search
None
See application file for complete search history.

(56) References Cited

U.S. PATENT DOCUMENTS

| | | | |
|---|---|---|---|
| 9,454,795 B2 | 9/2016 | Kweon et al. | |
| 10,037,598 B2 | 7/2018 | Gur et al. | |
| 10,176,560 B2 | 1/2019 | Gur et al. | |
| 2007/0040849 A1* | 2/2007 | Jeffrey | G09G 5/363 345/629 |
| 2018/0150943 A1* | 5/2018 | Gur | G06T 1/60 |

OTHER PUBLICATIONS

Writtenbrink, et al., "Cache Tiling for High Performance Morphological Image Processing", Journal of Machine Vision and Applications, vol. 7, No. 1, Winter 1993.
Yoon, H., et al., "Reducing GPU Address Translation Overhead with Virtual Caching", Computer Sciences Technical Report 1842, 2016.

* cited by examiner

Primary Examiner — James A Thompson
Assistant Examiner — Kim Thanh T Tran
(74) Attorney, Agent, or Firm — Hanley, Flight & Zimmerman, LLC

(57) ABSTRACT

A device, method, system, or article has multi-directional rolling cache to store image data.

25 Claims, 14 Drawing Sheets

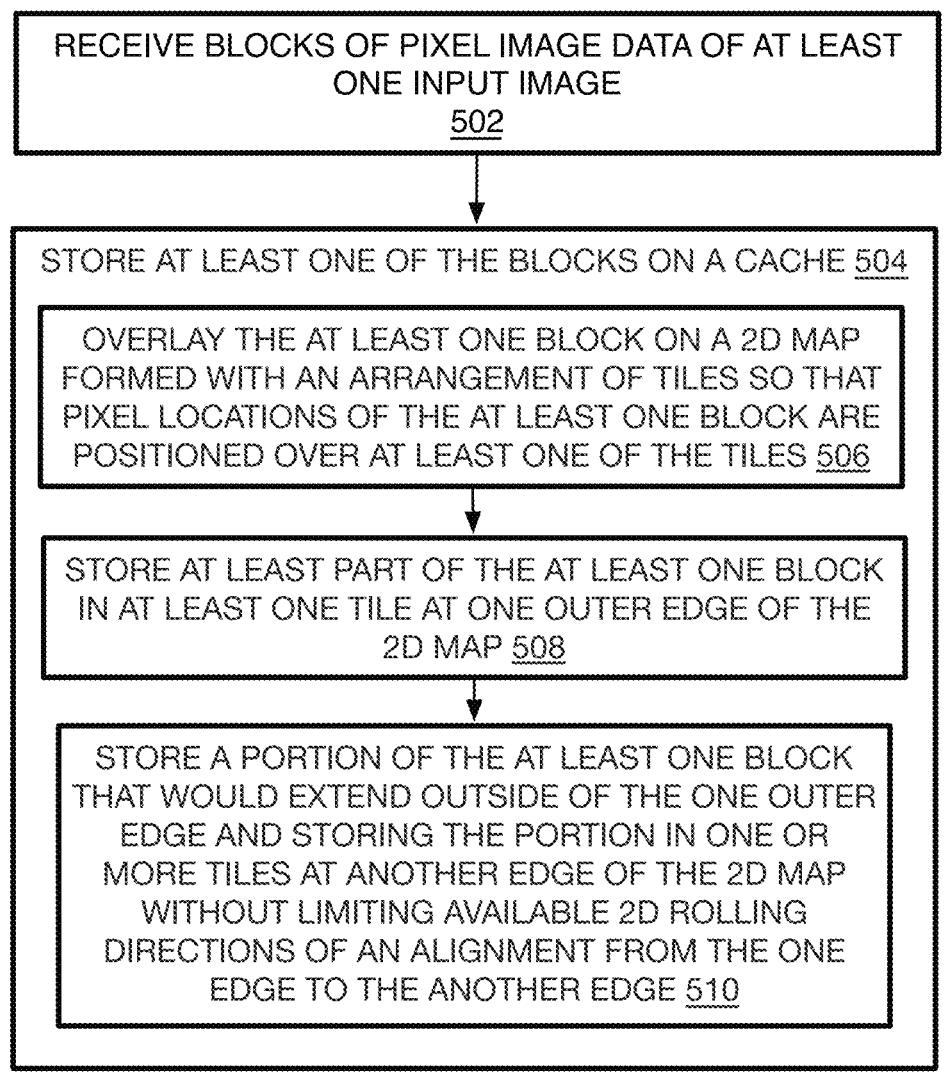

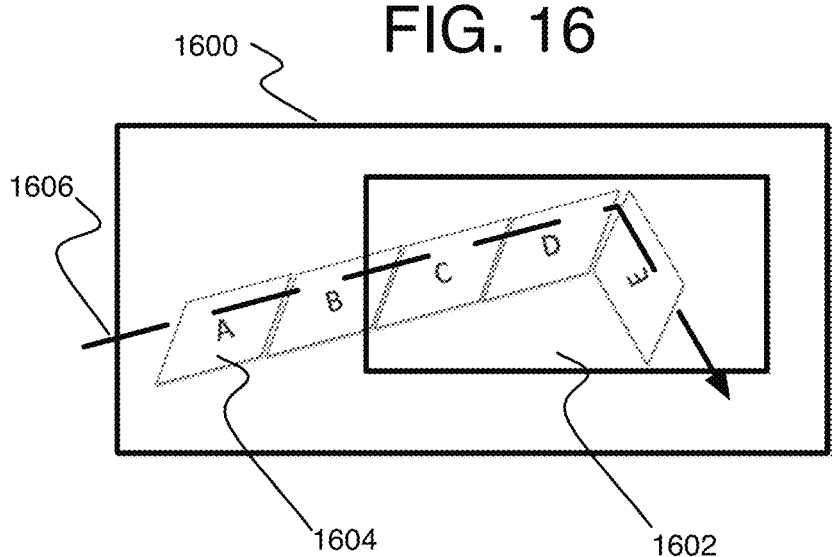
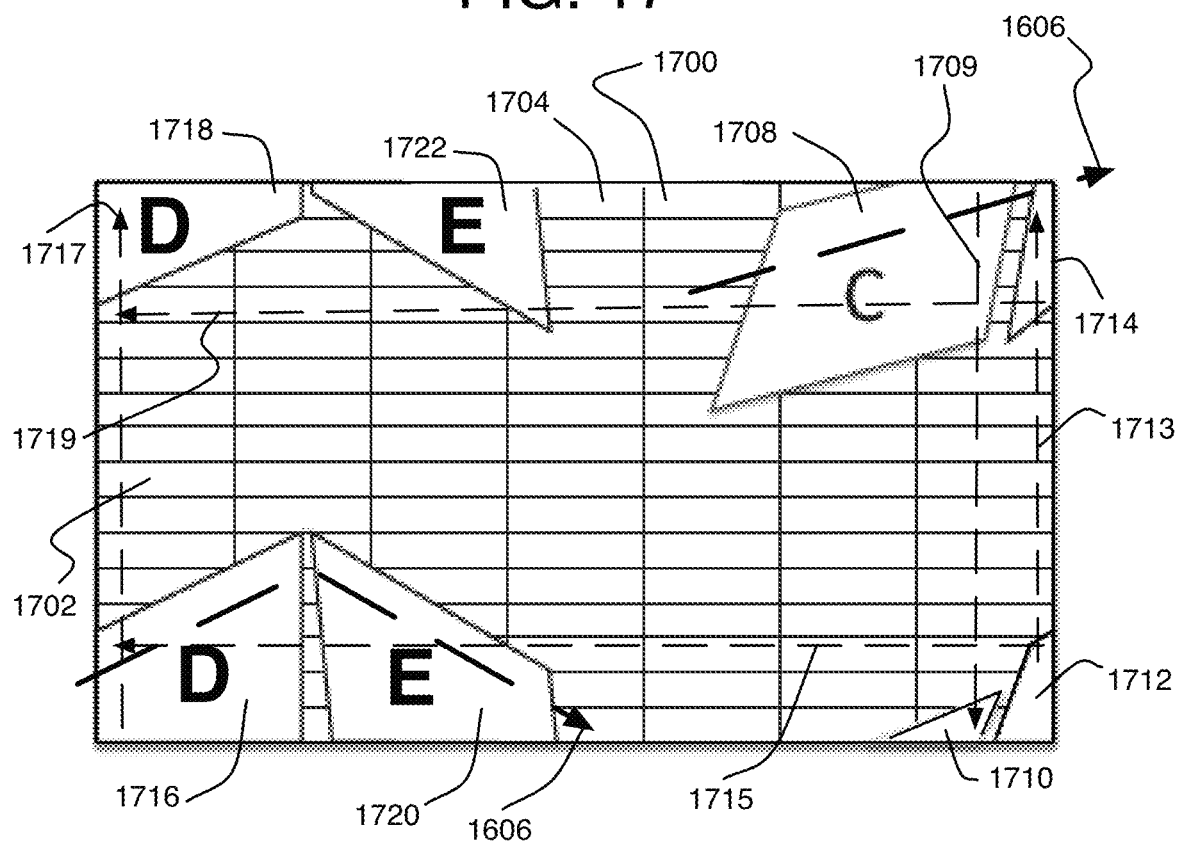

MULTI-DIRECTIONAL ROLLING CACHE AND METHODS THEREFOR

BACKGROUND

Many image processing applications convert or modify image data of an input image to generate a cleaner, enhanced, or corrected output image for display or further processing and/or analysis of the image data. Such applications use input image pixel data at one location to perform the conversions for other pixel locations such as with interpolation in a de-warping operation. While the data typically is stored in memory in a raster-scan order, the applications often need the input pixel image data in a geometric order as processing proceeds over an image, or more precisely, geometrically over the 2D pixel locations that provide pixel data that forms the image. This results in seemingly random memory read access patterns relative to the raster-scan order. Such randomness lowers memory transaction efficiency such as by lowering cache hits, thereby requiring larger local memory bandwidth and/or larger memory capacities with greater power consumption.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 5 is a method of image processing using a multi-directional rolling cache according to at least one of the implementations herein;

FIG. 16 is yet another example 2D mapping representation of a rolling cache according to at least one of the implementations herein;

FIG. 17 is an example input image used on FIG. 16 according to at least one of the implementations herein;

DETAILED DESCRIPTION

Figure 1:
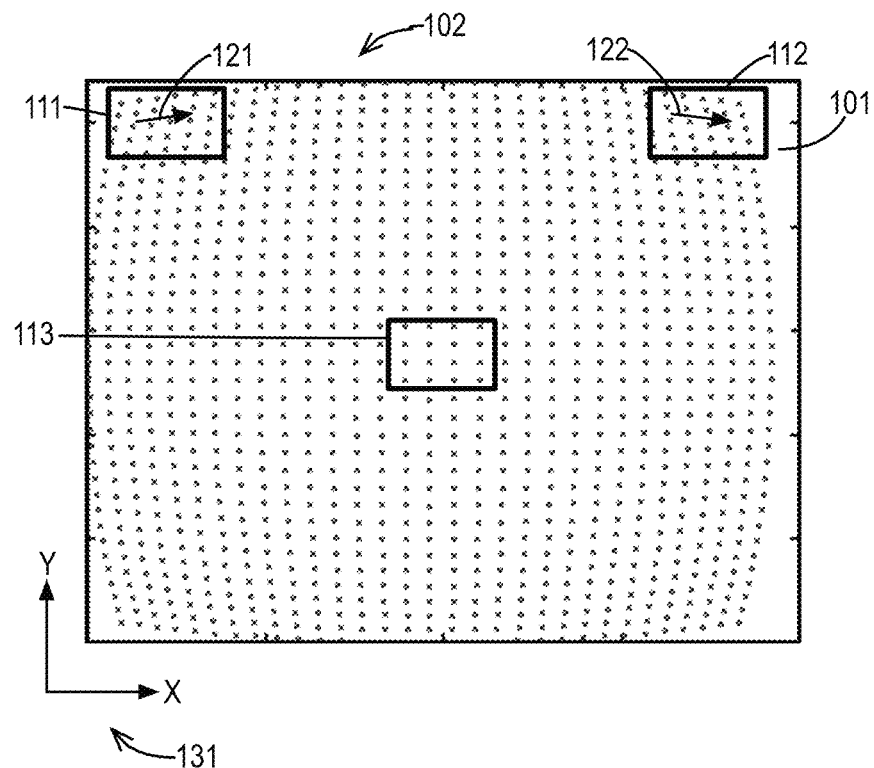
FIG. 1 is a schematic diagram of a grid of pixel locations for image modifications over an example input image according to at least one of the implementations herein.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes unless described otherwise. For instance, various architectures employing, for example, multiple integrated circuit (IC) chips and/or packages, and/or various computing devices that handle image processing such as computers, computer networks, computing devices, servers, laptops, desktops, tablets, phablets, or image processing modules of professional or consumer electronic devices such as one or more cameras, camera security systems, medical scope systems, or on-board vehicle, drone, robotic, or other computer vision camera systems, imaging devices, digital cameras, smart phones, webcams, video cameras, video game panels or consoles, televisions, set top boxes, Internet of Things (IoTs), and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein also may be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

A method and system of image processing with multi-directional rolling cache is described as follows.

Many image processing applications that convert image input to a corrected, enhanced, or cleaned output image include geometric distortion correction to de-warp original images, motion compensation-based noise reduction, digital video stabilization, projection applications, and many others. For example, the geometric distortion correction may convert a wide-angle or fisheye warped input image to a flat rectangular image. This involves using input pixel locations to interpolate a new output pixel location.

Similarly, motion-compensation (MC)-based noise reduction also may use input pixels in one location to generate new pixel data in another location. Specifically, noise estimates from a previous frame in a video sequence usually can be applied to a current image to remove the noise based on the assumption that the noise does not change significantly from one frame to the next frame (since they are merely 33 ms apart, for example). However, some image content still can move between adjacent frames so that motion is usually detected in MC noise reduction so that the correct cleaning estimate is applied correctly to moved pixel content. The motion compensation often involves a search of matching data from frame to frame so that blocks of data need to be processed one at a time.

Thus, these applications use one part of an image to compute another part of the image to perform image conversion processing. The result is that processing proceeds geometrically over a 2D array of pixels forming an input image, and the processors retrieve blocks of image data to perform the conversions along the geometric direction set by the conversion application.

Such conversion applications often are operated by a graphics processing unit (GPU) or image signal processor (ISP) that uses a double buffer external memory system where one input buffer is used to find and load data while the other input buffer is used for processing in order to save time, and the use of the two buffers was alternated. Initially, each input buffer was main or external memory that each held a whole frame. The external double buffers were replaced with the use of local buffers or cache, which was found to be more efficient by reducing the need for external memory transactions. When a single regular cache was used with the GPUs, it was found that the system was still too inefficient due to the randomness of the block-based read requests as described. Also, typical cache (or single local buffer) can only hold a maximum block size of image data at one time. When a next block was stored in the cache that overlapped a previous block, the overlapped data had to be fetched a second time to be placed in the local buffer, which wastes time, computational load, and power consumption.

To attempt to solve these problems then, a double local input buffer was used where two input buffers or caches received input image data, block by block along a geometric direction of the processing. Particularly, the external memory of the GPU was mapped to a 2D arrangement of cache lines formed in rows and columns. The blocks of pixel locations may be placed over the map of the external memory to determine geometrically which cache line should be used to store a part of the pixel blocks (or a group of multiple blocks) of the input image. This permits an entire block of the image data stretched over a number of geometrically arranged cache lines to be stored in one of the input buffers at one cycle. The double buffer then works similarly to that of the full-image buffers by switching buffers for each alternative load and processing operations except by storing a block (or group of blocks) in each buffer and for a single image. Such a system is disclosed by U.S. Pat. No. 10,037,598 to Gur, filed Nov. 29, 2016, and issued on Jul. 31, 2018, which is incorporated herein for all purposes.

The difficulty with the block-based double buffers is that the pixel locations or blocks in the double local buffers still often overlaps. When a block (or group of blocks) is placed in one of the buffers overlaps with the block(s) placed in the other buffer, the overlapping image data is copied from one buffer to the other buffer by an internal memory command. While this is a local memory transaction, this still wastes time and increases computational load and power consumption, thereby lowering performance. Otherwise, it is usually too complicated and inefficient to use data in one buffer to perform pixel coordinate calculations with data separately maintained in the other buffer even when such separated data was from adjacent or otherwise close pixel locations on the input image.

Also, due to the relatively limited capacity of the double input buffers, these systems still require the application to compute which input pixel locations are to be used to compute an output pixel location offline, or ahead of time. This may be performed for an entire frame to avoid delay during the use of the conversion computations, such as interpolation and translation, to determine the output pixel locations. This cannot be performed on the fly during the conversion operations without causing significant delays because blocks of data would need to be held in the input buffers well before such blocks are needed in the input buffers for processing. The input buffers usually would not have the capacity to hold a group of blocks large (or long) enough (from pixel locating to a block being processed for conversion) in a geometric processing direction. Thus, the input buffers would need to be context switched, for example, between blocks being used for locating pixels and blocks being processed for conversion. This causes too much delay in the operations.

Thus, such systems substantially reduce the ability to take advantage of the continuity of the image data on the same image. This results in greater power consumption to perform the pixel coordinate conversions, and results in lower performance.

To resolve these issues, the present method and system uses at least one multi-directional rolling cache. The disclosed unified buffer or rolling cache stores blocks of pixel data on a 2D map of cache tiles and as needed by an image processing application. The blocks are stored spatially on the rolling cache to correspond to the location of the blocks on an input image. The image processing application requests the blocks from memory, and in turn the rolling cache, in a sequence that naturally or inherently establishes a spatial geometric processing direction. The rolling cache acts as a virtual continuous surface so that when a block does not fit on the 2D map and would extend off of an edge on a first or one side of the 2D map of the cache, the remainder of the block, and subsequent blocks, can be stored in cache tiles on the opposite side of the 2D map of the cache. This permits the use of the cache and image processing block by block to continue in a rolling manner along a same single continuous spatial processing geometric direction on a single cache without a need to interrupt the process to restart the spatial geometric processing direction in a new random position on the cache. This eliminates or reduces the need for multiple buffers, and permits the rolling cache to remain relatively small. Also, the rolling from one edge of the 2D map of the cache to another edge can be done in any direction and is not limited by tile structure, etc. such as to raster order, to represent true virtual continuity of the cache 2D map surface to match the continuity of the input image.

The rolling cache also can be operated to eliminate or reduce the need to duplicate the storage of overlapped areas of adjacent blocks on the rolling cache. Parts of previous blocks of image data may be maintained on the cache in case it is needed for processing a more current block of image data that is adjacent and overlapping those previous blocks. This avoids wasteful duplication of writing the same previous data to the cache. Older data in the tiles and of a previous block need not be discarded until a new block is to be written in its place depending on the spatial general processing direction of the blocks. This makes the discarding more efficient than least recently used (LRU) discard systems that may evict data from the cache more randomly than necessary.

Thus, the disclosed cache, methods, and systems with multi-directional continuity of the image processing with a unified memory also significantly increases the cache hit rate and reduces external memory accesses, and in turn lowers power consumption, reduces the required memory area, and lowers memory bandwidth. This system also is scalable and adaptable for use with different or any random read patterns.

Finally, the disclosed structure and methods also permit the operation of on-the-fly input coordinate calculations with a reduced memory area and reduced power consumption to avoid the duplication of fetching overlapped block data.

It will be appreciated that the disclosed rolling cache and related methods, mediums, and systems disclosed herein will work with any image processing application that modifies an array of pixel image data by using pixel image data at one location of an image to modify or generate other pixel locations on the same image in a spatial general processing direction such that continuity of the image data is desirable to efficiently process the image data.

Referring to FIG. 1 for more detail, an example de-warping (or distortion correction) application is used herein to explain the disclosed system and method using multi-directional rolling cache, although many other types of image processing applications could be used instead. For the de-warping application, an example grid 102 of sparse sampled pixels of a warped input image or frame 101 for de-warping is arranged in accordance with at least some implementations of the present disclosure. The input image 101 may be stored in external memory and is to be provided to cache block by block to be locally available for processing. Sparse grid 102 may include multiple grid points that may represent or provide spaced pixel locations of the input image in order to translate the input image 101 to a corrected output image and interpolate pixel locations between the grid points. For example, the grid points of sparse grid 102 may define a sampling pattern in input image 101 such that pixel values of the input image may be interpolated and translated to a normalized pattern to provide a distortion corrected output image. As will be appreciated, input image 101 may include any suitable image content.

As shown, input image 101 and sparse grid 102 may be in an image coordinate system 131 that corresponds to an image capture orientation and/or image presentation orientation of input image 101. Sparse grid 102 may correspond to an image capture device (e.g., camera and/or image capture pipeline) used to capture input image 101. For example, sparse grid 102 may correspond to a camera lens or lenses, to a dynamically measured image or video stabilization distortion, or the like such that distortion may be removed from input image 101. However, sparse grid 102 may be generated using any techniques such that a desired warping or de-warping is provided for input image 101.

Also as shown, input image 101 and/or sparse grid 102 may have regions or blocks 111, 112, 113 and directional vectors 121, 122 that indicate the direction of distortion or displacement to move the pixel or grid locations of the regions to output pixel locations. Thus, sparse grid 102 may be used to translate input image 101 to a corrected or de-warped output image. For example, geometric distortion correction techniques or the like may take pixel values or pixel data from input image 101 within each tetragon defined by four of the grid points of sparse grid 102 and output to a rectangle of the corrected image.

Figure 2:
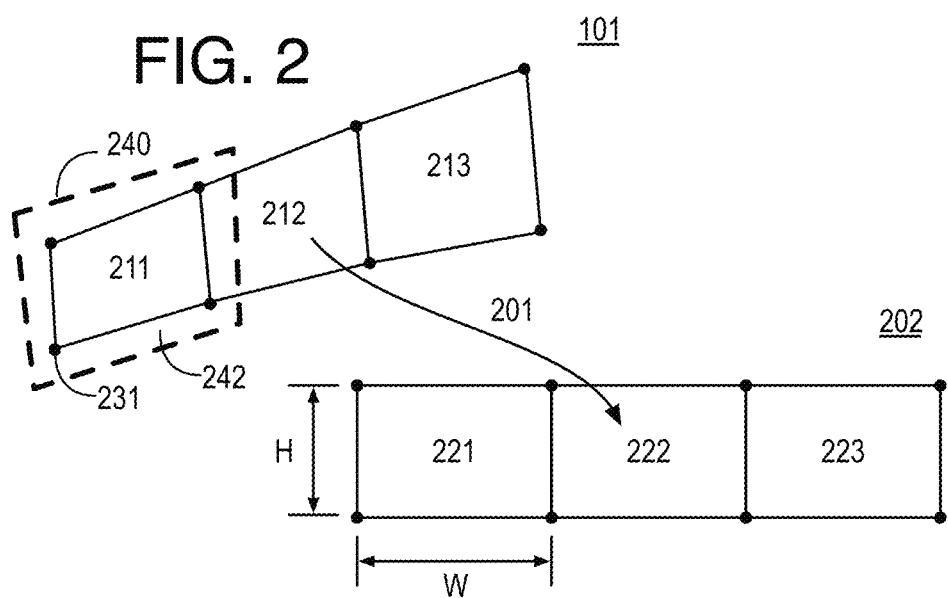
FIG. 2 is a schematic diagram of an example interpolation from tetragon blocks to rectangular blocks according to at least one of the implementations herein.

Referring to FIG. 2 specifically, an example interpolation 201 from tetragons of input image 101 to rectangles of an output image 202, are arranged in accordance with at least some implementations of the present disclosure. Example tetragons or blocks 211, 212, 213 of input pixel image data may be formed such that each tetragon is defined or represented by four grid points such as grid point 231 of sparse grid 102 (i.e., such that each corner of tetragons 211, 212, 213 is a grid point of sparse grid 102). Based on the pixel data of input image 101 and the geometries defined by tetragons 211, 212, 213, interpolation and translation may be performed to generate rectangles 221, 222, 223 of a corrected output image 202. In the illustrated examples, the sampling shapes of sparse grid 102 are tetragons and the corrected output shapes of output image 202 are rectangles having a shared height H and a width W. Also, the input block size may vary for each or individual output blocks depending on the image geometric distortion or the image motion vector, for de-warping. Also, the sampling shapes of sparse grid 102 may be any suitable shape such as three, four, five, or more cornered shapes and the output shapes of output image 202 may be any suitable corresponding shapes such as equilateral triangles, rectangles or squares, regular pentagons, and so on.

Thus, during de-warping, each tetragon of four pixel locations from the grid 102 may form a block, with the pixel locations at the corners of the tetragon or block forming the anchor pixels for that block. In order to perform interpolation and translation for an input block of pixels as on grid 102 to form an output rectangular block, a memory block 240 (shown in dashed line) larger than the actual input block size is obtained from memory and that has a filter margin or filter support area 242 along the outer edges of the input block. The enlarged memory block is the block to be read from external memory and placed in the rolling cache for the image processing application to be able to correct the input image block by block. In other words, in order to generate interpolated pixels near the edge of the input block on the grid, pixels from outside of the block may be used in calculations. This filter margin or filter support 242 often contributes to the overlaps between adjacent memory blocks that previously required duplication of memory writes to cache.

Also, the de-warping is often an iterative process where the initial input block may be generally tetragonal with curved or non-linear sides for example. During interpolation iterations, the shape of the tetragon may be shifted to intermediate parallelograms for example, and in a final translation, when all interpolation is complete, the pixel locations are shifted to form the more precise rectangle shape of an output block.

Otherwise, any appropriate interpolation filter and/or technique method may be used, including, for example, nearest neighbor interpolation (e.g., selecting nearest pixel), bi-linear interpolation (e.g., using a 2×2 window of input pixels and interpolating the output pixel value), bi-cubic interpolation, a look-up table, a poly-phase filter (e.g., with 64, 128, 256, etc., phases), configurable filter sizes, adaptive filter coefficients, and so forth.

Figure 3A:
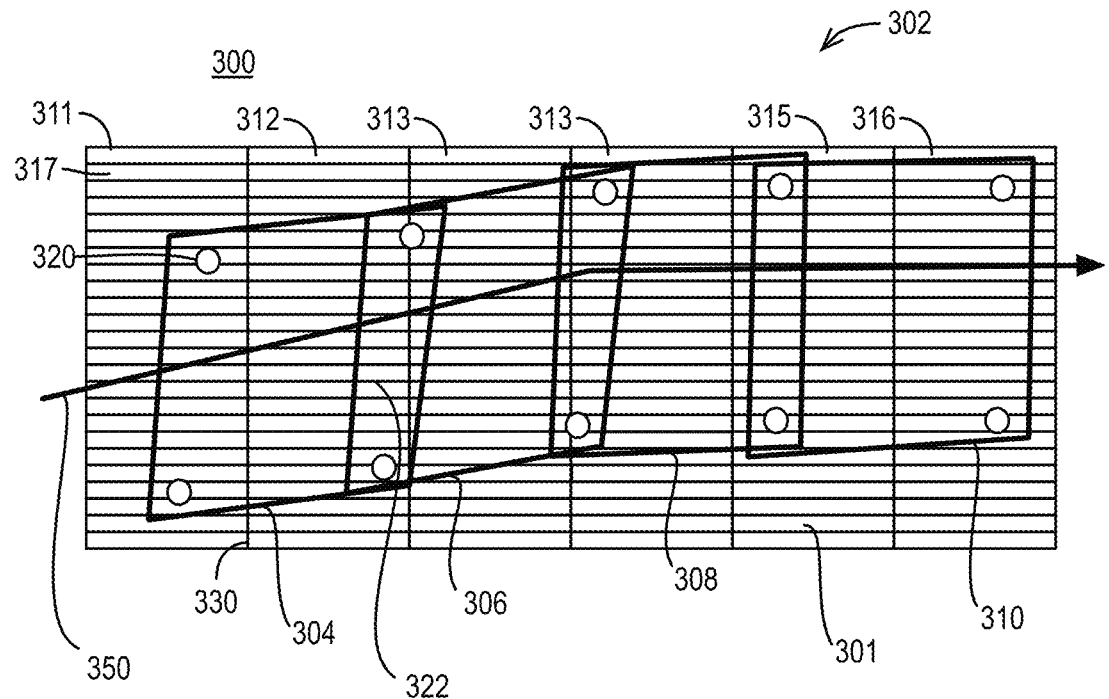
FIG. 3A is a schematic diagram of a cache with tiles formed in a 2D map and memory blocks overlaying the tiles according to at least one of the implementations herein.

Referring to FIG. 3A, a conceptual representation of an example rolling cache (or local buffer or local memory) 300 for storing pixel values of an input image is arranged in accordance with at least some implementations of the present disclosure. Cache or local memory 300 may be conceptually arranged in rows and columns of tiles 301 separated by tile boundaries 330 to form a 2D map 302 that corresponds to, or represents, the 2D pixel space of an input image. Each tile 301 may be stored as a cache line in the actual physical memory of the cache 300, and each tile 301 may have a virtual address that includes an index location of the 2D map 302.

As shown on 2D map 302, tiles 311-316 may be stored or indexed in a successive order of cache lines on 2D map 302, while the tile 317 under tile 311 is not successive with respect to tile 316 on the 2D map 302. As actually stored in the physical cache forming rolling cache 300, each tile 301 may be stored or listed in an order of cache lines such as raster order, but this is not a requirement. The actual order of cache lines as stored can be any desired order as long as the tiles 301, and in turn cache lines, are indexed by location on the 2D map 302.

The data is fetched from the local memory (or rolling cache) 300 per tile or in an amount of tiles, such as one or more tiles. The number of pixels stored within a single tile 301 depends on the pixel bit precision (depth). The total cache size or total number of tiles in the cache 300 is configurable and depends on the usage of the rolling cache. For example, a size of a tile can be 32×8 bytes or 16×8 bytes where 32×8 or 16×8 is the representative layout and count of pixels in a single tile on the 2D map, and here with 1 byte of storage space per pixel. When the image data for an individual pixel is 10,12, or 16 bits, in this case two pixel positions in a tile must be used for a single pixel. Thus, here, the 32×8 tile contains 16×8 pixels. Otherwise, when a pixel is 8 bits, the 32×8 tile has 32×8 pixels. The pixel image data held in cache 301 here is usually pixel coordinates for a de-warping application as well as chroma and luma values for the pixel. However, the pixel data such as chroma data, luma data, and any other accompanying per pixel data still may be held in external memory or other local buffers or cache. The cache itself reads in a granularity of a pixel. Specifically, the cache may be arranged in a way that separates each tile into several banks of separate groups of pixels. This arrangement permits access to an X×Y pixel window that may divide one or more tiles, where the window size may be required for interpolation into the output pixels, and where each group of pixels can come from a different tile. On the other hand, a read (RD) request from the external memory to the local cache is in a granularity of tiles. The control that manages a data fetch and the data release works on the tile granularity. Once a tile is fetched to cache, however, the access to cache is in pixels.

In the context of accessing local memory 300, to access any portion of a tile (e.g., a single pixel value or the like), and as explained below, the entirety of the tile may be used to determine if a cache hit or miss occurs, but this can be accomplished without actually accessing the cache. Specifically, the hit or miss may be determined ahead of time with already existing data because the desired input coordinates are already calculated (the required initial input pixel location (IPL) for matching output pixel location (OPL) is calculated before accessing the cache), and in this cache hit/miss stage, the device determines if there is a need to fetch new data (miss) or not (hit) so that when a cache RD attempts to access the cache to read pixels for interpolation (or other operations), the required data definitely already will be in the cache. Furthermore, accesses of local memory 300 may be made such that each access may retrieve the data within a 2-dimensional region of local memory 300. For example, square or rectangular portions of local memory 300 with multiple tiles may be accessed with a single memory access command (or during a single cycle) by defining a top left tile and a bottom right tile for the memory access, for example. Thus, for example, the pixel image data of four tiles may be fetched from the memory 300 at once. By an alternative form, a fetch from local memory 300 may be performed by tile index addresses on the 2D map 302 for any combination of tiles.

The local memory 300 also shows memory blocks 304, 306, 308, 310 overlaying the 2D map 302 of the memory or cache 300. These memory blocks are blocks of pixel data obtained from an input image 101 with an array of input or initial pixel locations that form the shape of the blocks, here being tetragons or quadrilaterals. The blocks may be fetched from main or external memory for placement into local memory 300, and the overlaying of the blocks 304-310 on the 2D map 302 represents the placement of the blocks 304-310 into the local memory 300, and is referred to herein as placing the blocks into or on the tiles 301.

Figure 3B:
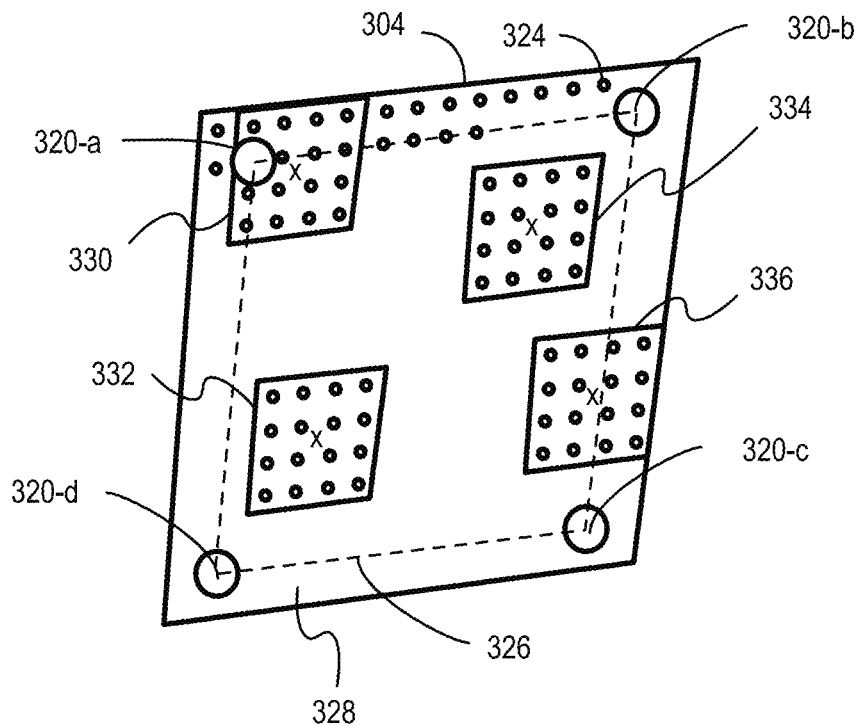
FIG. 3B is a schematic diagram of a memory block overlaid on the cache tiles of FIG. 3A.

Referring to FIG. 3B, example memory block 304 has pixel locations 302-a to 302-d forming the block, and may be the sample grid points 121 from grid 102 (FIG. 1). The pixel locations 302-*a* to 302-*d* are shown as the key points (or tetragon points) or pixels 320 on 2D map 302 (FIG. 3A). For this example, block 304 overlays or covers tiles 301 storing pixel data provided by block 304 as shown on 2D map 302. The key points 320 correspond to four corner points that form the input image block 326 (shown in dashed line) within memory block 304 for example. As discussed herein, the memory blocks 304, 306, 308, 310 are larger than the input image blocks 326 with the points 320 near the corners of the memory block 304 and include pixel positions 324 in a filter margin or filter support 328 that may be used to perform de-warping interpolation computations.

By one form, the size of the memory blocks 304 are not particularly limited and by one example, may be as small as about 4×4 pixels to as large as about 16×16 pixels. In one form, each block may have 64 or 128 pixels total. Other examples of details of the memory block sizes are provided below.

Also shown here, the image processing application, such as a de-warping application, may fetch a memory block 304 in order to perform interpolation computations in many different orders, which can include computing output pixels disbursed though-out a memory block 304. The interpolation is not limited to a raster-scan order for example. The example here, shows filters 330, 332, 334, and 336 spread out on memory block 304 to compute an interpolated pixel location (shown by an 'x'). This also demonstrates how the filter support 328 may be used where the filters extend into the filter support 328.

Referring again to FIG. 3A, the memory blocks 304, 306, 308, and 310 may overlap due to the input pixels needed to perform the interpolation filtering for example, although the input image blocks 326 also could directly overlap as well. For example, memory block 304 may overlap with memory block 306 forming an overlap 322. In these cases, just the remainder of a block 306 may be written to the cache when the overlapped area 322 is already in the cache since it was loaded as part of memory block 304. As described below, memory block 304 may not be discarded (or evicted) until the space on the tiles memory block 304 occupies is needed for a new memory block. However, once processing is complete for memory block 304 and checked to see if it is needed to process any adjacent blocks, the memory block 304 may be marked as checked and released, and therefore its tiles are available for overwriting. Thus, the rolling cache 300 may be a single or unified local memory with sufficient capacity to hold a sequence of memory blocks so that this arrangement eliminates or reduces the need to duplicate loading of pixel data of an overlapped area of two memory blocks.

The memory blocks 304 to 310 also may be positioned on the 2D map 302 according to a walking order or a spatial general processing direction as shown by arrow 350. The memory blocks are loaded onto the cache as needed in a sequence of the memory blocks set by the image processing application. Thus, the direction 350 depends on the order the pixel location data is needed rather than any other order, such as raster scan order when not needed by the image processing application. The direction of the order is not limited to any specific direction, such as horizontal or vertical, and can be any direction in 360 degrees on the face of the 2D map. The order also is not limited to a linear direction across the 2D map. The direction 350 may have sharp or (seemingly) curved or random turns. Thus, in this example, the memory blocks may be loaded onto local memory 300 in order of the spatial general processing direction 350 so that memory block 304 is loaded first, then memory blocks 306, 308, and 310, and as, or just before, needed by the image processing application. The direction 350 also may have breaks as the image processing application restarts at memory blocks that are not adjacent to each other.

Figure 4:
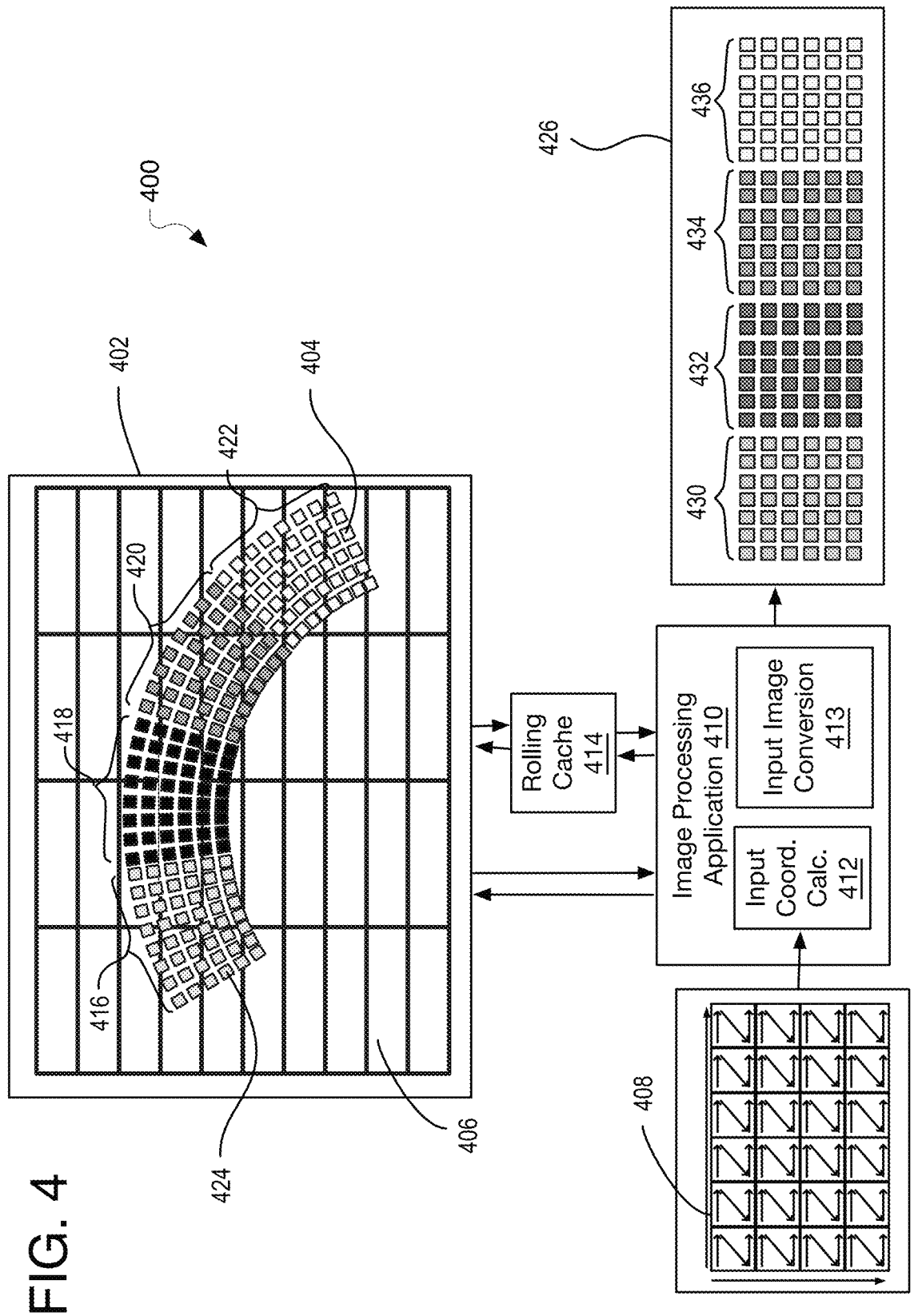
FIG. 4 is a schematic diagram of an example image processing system according to at least one of the implementations described herein.

Referring to FIG. 4, an image processing system 400 according to at least one of the implementations herein has an external memory 402 holding input pixel image data 404, an output image 408 of output blocks each with output pixel locations, an image processing application 410, a rolling cache 414 and an output image 426. The external memory 402 is shown storing input image blocks 416, 418, 420, and 422 of pixel data. The image processing application 410 converts blocks 416, 418, 420, 422 of the input image 404 respectively into output blocks.

More specifically in this example, processing proceeds according to the output pixel position needed to be matched to an input image pixel location. Thus, the output pixel positions may be provided block by block, and generally in a raster-scan order as shown by the output grid 408. The input pixels used to generate an output pixel location are not necessarily in the same order as the output pixel locations, resulting in the random patterns of input image data needed to find the input image pixels to use for interpolation (or other image processing) for a current output pixel location.

The image processing application 410 may have an input coordinate calculation unit 412 to determine which input image block or blocks to retrieve in order to generate the image data for an output pixel location. The system 400 then determines if the data is not already in the rolling cache 414. If not, the desired input image blocks are retrieved from the external memory 402 and placed in the cache for transmission to the image processing application.

External memory 402 is shown divided into cache tiles 406 to show which cache tiles 406 will store the input image blocks 416, 418, 420, and/or 422. It should be noted that each small square 424 of the input image blocks 416, 418, 420, and/or 422 could be a single pixel or M×N pixels. This is simply provided to demonstrate the shape of the input image blocks 416, 418, 420, and/or 422 for example, and a read pattern of the input blocks. The blocks 416, 418, 420, 422 are not rectangular and each cover multiple tiles.

The rolling cache 414, as described herein, may have a 2D map as described above in the same tile pattern as with tiles 406 that are shown extended over the external memory 402. Once the block or blocks are placed in the rolling cache 414, the input blocks 416, 418, 420, 422 may be accessed in a non-regular pattern which is not aligned to (or in other words, not restricted to) the rows and columns of the cache lines/tiles 406 (as arranged on the rolling cache 2D map), and this pattern depends on the image processing application 410.

Whether the blocks are then obtained from the rolling cache or directly from the external memory 402, the image processing application 414 may have an input image conversion unit 413 that generates output pixel locations from the input image pixel data, and by one form, block by block as described. This may be the interpolation for de-warping or other image processing types, such as motion vector generation for de-noising as one other example. The resulting output from the image processing application 410 may be rectangular blocks 430, 432, 434, and 436 that respectively correspond to input blocks 416, 418, 420, and 422.

The rolling cache 414 operates as described herein to avoid duplication of writes when blocks overlap. The rolling cache 414 also rolls the input image data of blocks (not shown) that extend passed one (or first) edge of the 2D map of the rolling cache to another (or second) edge of the 2D map of the rolling cache in order to form a virtual continuous surface for the 2D map. The rolling operations thus permit the placement of subsequent blocks leading from the second edge in order to continue a spatial general processing direction from the first edge and being used by the image processing application.

Referring to FIG. 5, an example process 500 of image processing with a multi-directional rolling cache is arranged in accordance with at least some implementations of the present disclosure. In the illustrated implementation, process 500 may include one or more operations, functions or actions as illustrated by one or more of operations 502 to 510 numbered evenly. By way of non-limiting example, process 500 may be described herein with reference to image processing systems or structure 400, 600, and 1800 (FIGS. 4, 6, and 18 respectively), or any of the other structures described herein, and where relevant.

Process 500 may include "receive blocks of pixel image data of at least one input image" 502, and as described, blocks of an input image that may not be rectangular, may be tetragons, and may be enlarged memory blocks to include interpolation filter support. An image processing application may determine an order to retrieve input blocks needed for processing thereby establishing a spatial general processing direction of a sequence of the input blocks.

Process 500 may include "store at least one of the blocks on a cache" 504, also referred to as a local memory, local buffer, rolling cache, or just buffer or memory herein. Thus, process 500 may include "overlay the at least one block on a 2D map formed with an arrangement of tiles so that pixel locations of the at least one block are positioned over at least one of the tiles" 506. Here, the at least one block is positioned over the 2D map, which is a conceptual construct. The tiles may have index values or addresses that indicate a tile position in the 2D map. Each tile may be a cache line and stores a predetermined maximum amount of bytes of image data, and in turn a maximum amount of pixels (or pixel data such as pixel coordinates), and of the pixels that are positioned over the tile on the 2D map. A single block may cover multiple tiles.

Process 500 may include "store at least part of the at least one block in at least one tile at one outer edge of the 2D map" 508. This refers to a situation when blocks are being stored along the spatial general processing direction where a block covers one or more tiles that are at an outer edge of the 2D map. It should be noted that a total outer edge may be a rectangular outer edge, and the one outer edge may be part of the total rectangular outer edge, such as one side of the total outer edge. Otherwise, the total outer edge of the 2D map may be circular or some other shape. In the case where the total outer edge is not easily divisible by noticeable breaks (e.g., corners or changes in linear direction), then the one outer edge is a portion of the total outer edge.

Process 500 may include "store a portion of the at least one block that would extend outside of the one outer edge and storing the portion in one or more tiles at another edge of the 2D map without limiting available 2D rolling directions of an alignment from the one edge to the another edge" 510. Thus, as mentioned, when a block cannot be completely stored at tiles near or at the one edge of the 2D map, then the storage of the block can be continued at the another edge that is different than the one edge. The difference simply may be a different side of a rectangular or other polygonal shaped total outer edge of the 2D map, or otherwise different portions of the total outer edge of the 2D map. Either way, the rolling direction of the alignment between the tiles at the one and another outer edge is not limited to certain directions, such as raster-scan, horizontal, or vertical directions. Thus, this accommodates a spatial general processing direction in any direction (360 degrees). For example, a block portion at a tile on a right edge of the 2D map may be extended to the right by extending the block portion into the left edge of the 2D map as if the surface of the 2D map was continuous. This extension from one edge to the other can occur in any direction from 0 to 180 degrees since the right side of the 2D map is vertical. The same could then be said about a spatial general processing direction extending out of the left edge of the 2D map and back into the right edge of the 2D map instead. In this case, the available directions would be from 180 degrees to 360 degrees. Thus, cooperatively, the available directions for the rolling direction alignment is 360 degrees. The tiles to be used on the second edge may be referred to herein as roll tiles. More examples are provided below.

When an input image block is requested by the image processing application, the system may check whether a cache hit occurs for that block. This cache hit search also acts to check for block overlaps. Thus, if a hit occurs on a previously stored block. An overlap is present and the data already on the cache is not retrieved from external memory again. Instead, just the miss or non-overlapping portion of the requested input image block is read from external memory and written to the rolling cache. This may include the use of a block overlap need table that lists a need table for each block already on the rolling cache, and a valid table that lists at least unavailable occupied tiles that cannot be assigned to the requested input image block including the roll tiles. Other details are provided below.

Figure 6A:
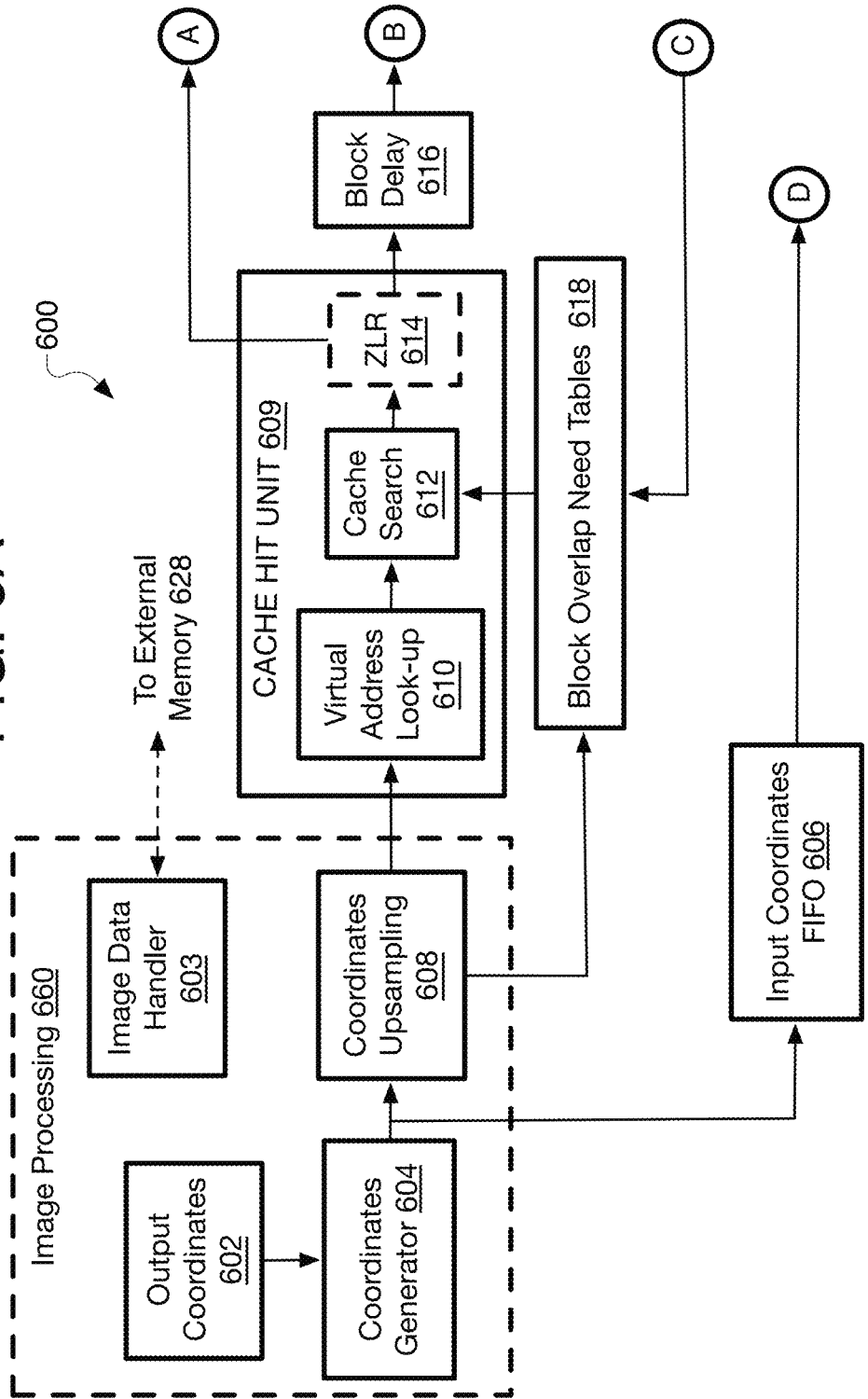
FIG. 6A-6B is a schematic diagram of another example image processing system operating a rolling cache according to at least one of the implementations described herein.
Figure 6B:
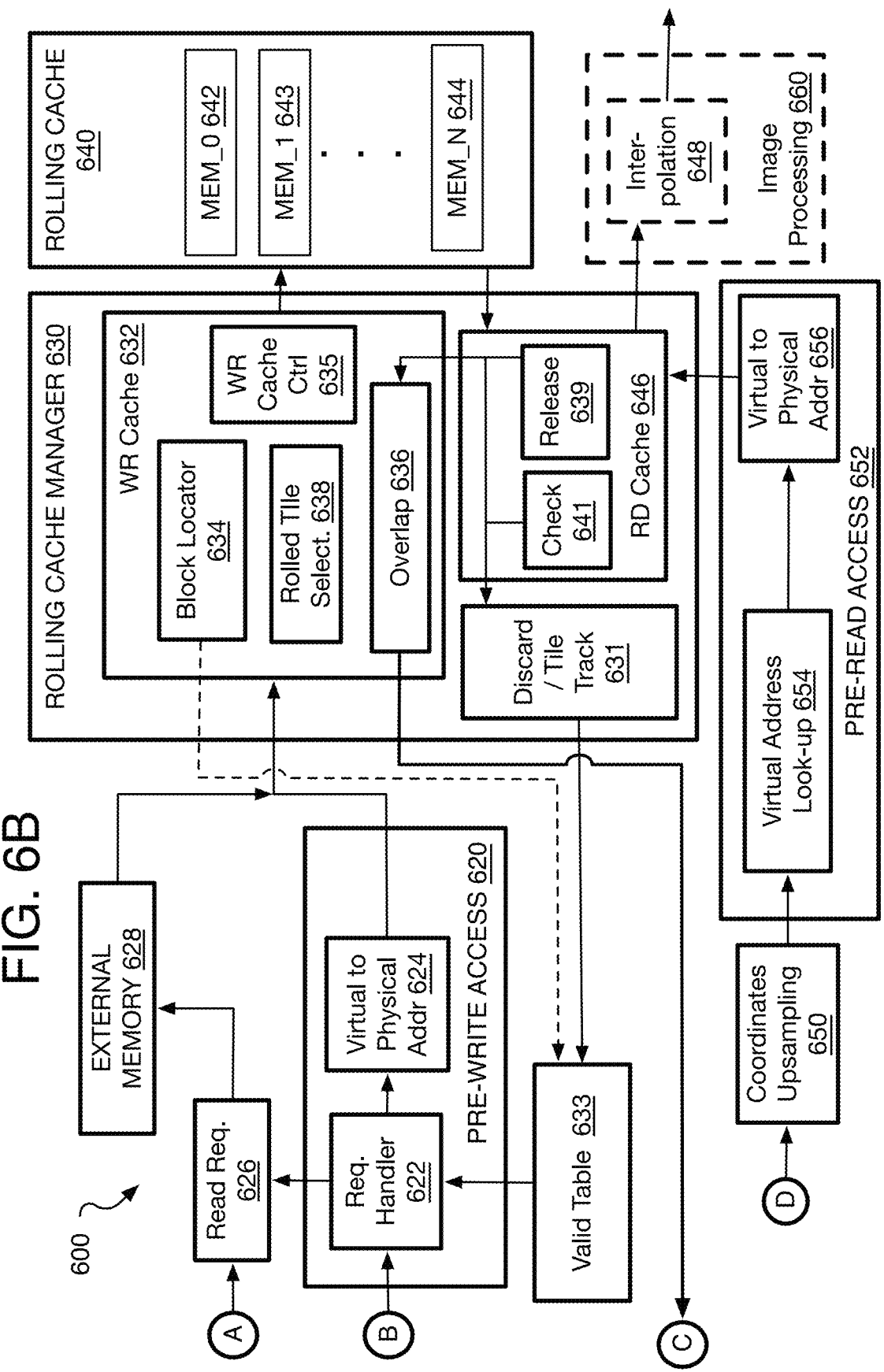

Referring to FIGS. 6A-6B, an image processing system 600, according to at least one of the implementations herein, has a rolling cache manager 630 that operates a rolling cache 640 to implement the rolling cache structure and rolling cache management techniques described herein. It will be noted that the rolling cache manager 630 may include or have those units, components, and/or modules of system 600 that are usually included in a cache manager as well as those implementing the disclosed multi-directional rolling and overlap related techniques. Thus, it also will be appreciated that any of the cache or memory-related units shown in system 600 may be considered to be included in or part of the rolling cache manager 630 when found to be desired or efficient.

By one alternative, the system 600 may have, or receive, data from an image processing application 660 that may use the rolling cache 640 to store data for distortion correction (de-warping) or other tasks that convert arrays of pixel image data. The image processing application 660 may provide output coordinates 602, and by one form block by block, and in a predetermined order such as raster-scan order within each block. The image processing application 660 may have a coordinates generator unit 604 that translates the integer output pixel locations 604 to non-integer input image pixel locations or coordinates that are to be placed in external memory 628, and thereafter in the rolling cache 640. These translations may use chroma and luma data of the pixels that is provided by an image data handler 603 that obtains the image data from, or places the image data in, an external memory 628. The translations also may be performed block by block in the present example to perform the subsequent interpolation or other image processing. These input blocks are the memory blocks described above with the included filter support pixels, and the image data of each pixel including at least the chroma and/or luma values associated with the pixel image data that may be initially found in the external memory 628 and to be placed in the rolling cache. The translation into input image pixel coordinates is performed by an algorithm which translates output coordinates to input coordinates depending on the use-case. For example, geometric correction is done by geometric distortion correction (GDC) translation algorithms, and for motion compensation, the translation is by Temporal Noise Reduction (TNR) translation algorithms. The present method is not limited to these algorithms, and any translation of output coordinates to input coordinates can be supported.

The transformation here also is performed on a sampling of the input pixels such for every 2nd pixel and every 2nd line (so that every one out of four pixels is translated) rather than all input image pixel locations for example. However, the present methods also support full (non sub-sampled) coordinates. The subsampling may reduce more area but can be bypassed when the input is not sub-sampled.

The input pixel coordinates are then provided to both an upsampling unit 608 that is provided for write accesses on the rolling cache 640 and an input coordinates first-in first out (FIFO) buffer 606 that is provided for a read access path with read requests and read accesses on the rolling cache 640. The input coordinates FIFO buffer 606 stores the read requests until the requested data arrives from the external memory and is written to the rolling cache 640. The input coordinates FIFO buffer 606 also holds the input coordinate locations before upsampling for the read requests. The read access path of the system 600 then can "mimic" some of the write access units in order to know what to read from the cache.

The coordinates upsampling unit 608 for write access generates missing input pixel locations not already generated by the coordinates generator unit 604. The upsampling is performed by using interpolation with the surrounding pixel locations already generated. The interpolation here may be performed by bi-linear interpolation, which is less sophisticated and uses less computational load than other conventional methods. The read access units also have their own upsampling unit 650 that uses the input image coordinates stored in the input coordinates FIFO buffer 606.

By one form, the generation of the coordinates by the coordinates generator unit 604 and upsampling unit 608 are considered part of the image processing unit 660, although other variations are contemplated, such as being part of the rolling cache manager 630 instead.

Also, it will be appreciated that units of system 600 that perform the same or similar tasks, such as the write access upsampling unit 608 and read access upsampling unit 650, actually may be a same single unit that is used by both types of cache accesses. System 600 is shown here with two separate units instead to perform separate but parallel pipe processing on different blocks when so desired, but is otherwise simply shown for ease of explaining the work flow of system 600.

A cache hit unit 609 receives the input pixel coordinates from the coordinates upsampling unit 608 in order to determine if the pixels, or blocks of the pixels, are already stored on the rolling cache 640. To accomplish this, and after the coordinate upsampling by the coordinate upsampling unit 608, a virtual address look-up unit 610 translates the input coordinates for a certain block into tile locations in an input frame and then into pixel virtual addresses. This is performed by looking up cache virtual addresses on a valid table 633 to assign the virtual addresses to the input coordinates forming an input memory block, where each virtual address is specific to input coordinate values of a single pixel. The valid table 633 indicates which tiles in the cache are already occupied by previous blocks. The valid table 633 may be updated once a new tile (or tile portion) arrives from external memory. By one form, the corresponding pixel locations, and in turn virtual addresses, of the tile for a new current block may be updated only after the data arrives and is written to cache. The valid table 633 may be stored on convenient and/or efficient memory, and the size of the valid table 633 may be at least partly dictated by the size of the rolling cache. For example, if the cache can vertically hold M tiles and horizontally hold N tiles, the number of bits for one valid table is M×N bits. The valid table 633 may be implemented in a way so that each block that currently is in the system (in the pipeline of blocks) has its own valid table 633. The valid table 633 may indicate whether a tile is in the cache by using only a single bit for a single tile. In addition, the valid table 633 may indicate and hold the anchor point which indicates the tile address relative to a key point on a frame such as the top left corner of the entire frame. Using that anchor point, no need exists to store all the tile addresses explicitly in the frame domain and in the valid table 633. Thus, one bit per tile can indicate the exact tile location in the frame using the anchor point (x,y) plus an offset (x,y) from the anchor point. The valid table 633 and the tile addresses are explained in greater detail below.

Once the tile locations and virtual pixel addresses of the pixel of a tiles are obtained from the virtual address look-up unit 610, a cache search unit 612 then uses the virtual addresses and tile locations to determine whether or not the input coordinates are already on the rolling cache 640. This may include comparing the virtual addresses of pixels on a current memory block to the virtual addresses of pixels of one or more previous blocks already stored on the rolling cache 640. This may be accomplished by using block overlap need tables 618 controlled by an overlap unit 636.

Particularly, the overlap unit 636 of a write (WR) cache unit 632 calculates, ahead of fetching into the rolling cache, all the needed data (e.g., pixel locations) that are required for a specific current memory block, and generates a block overlap need table 618 indicating the virtual addresses of the pixels in the current memory block. This is performed by having the overlap unit 636 obtain the per-pixel virtual addresses of the current memory block from the virtual address look-up unit 610.

The need table 618 also may be updated by the cache hit unit 609. Since the calculations for fetching are performed in a pipeline or system 600, each unit in the system 600 can work on a different block in parallel to the work on other blocks by other units. Thus, each block in the pipeline can have its own need table 618. Every tile, no matter if it is a HIT or MISS is listed in the need table of the block. The overlap unit 636 or the cache search unit 612 merely compares the need tables, and this may be accomplished by using hardware. By one form, the overlap unit 636 obtains data to input to registers of comparison hardware, while the comparison hardware itself may be considered to be part of the cache search unit 612. Adjacent blocks may be compared to find which tiles exist in both blocks and which tiles exist on only one of the blocks, and this can be performed for multiple adjacent blocks.

The comparison of need tables of adjacent blocks may be performed in a very efficient way. A need table 618 indicates an anchor point of each required tile by using a single bit for each tile so that when the cache size is M×N tiles, the need table per block is M×N bits. In this case, the comparison may include comparing M×N bits of each block. For any tiles that exist only in block N−1 (the previous block) and not in block N (the current block), for example, can be discarded when the output interpolation for block N−1 is completed. Thus, the discard stage for the data of previous block N−1 can be performed once the processing is complete for previous block N−1 (such as when all output pixels are interpolated) and once the need table of current block N is complete. As mentioned, this can be repeated with multiple adjacent blocks, so that the need table of the current block is compared to need tables of previous blocks N−1, N−2, and so forth. In this form when a group of blocks exists as in the block sequences explained herein, each block may be compared to all of the other blocks on the rolling cache. In that form, all the required data for a certain block is calculated ahead of time so that when a RD cache unit 646 accesses the cache to read the pixels for interpolation, the required data already will be in the cache and no degradation in performance can occur.

Thus, the block overlap needs tables 618 may have a structure that includes one need table for one block. In addition, every need table has it own anchor point. Thus, the structure of a need table can be very similar to that of a valid table. The main difference is that the valid table 633 may indicate which tiles are occupied in the cache and the need table 618 may indicate which tiles are required for a certain block. Alternatively, while each block in the cache may have its own need table, actually each block may have its own section of a single need table.

Once the cache search unit 612 compares the need table of the next (current) block to the previous need tables of the other previous blocks, only the data which is in the current block need table but not in a previous block need table is marked as a MISS and will be fetched from the external memory to place that missed data in the rolling cache. Otherwise, data in the current block need table that is already present in one of the existing previous block need tables is marked as a HIT. The HIT data from the previous block then may be maintained on the rolling cache, and the fetch for the HIT data is omitted.

When a cache hit occurs, whether for particular pixels, part of a block of pixels such as with the block overlaps described herein, or a whole block of pixels, the write is then dropped for that requested input image data.

When a cache miss occurs and the missing input image data is to be obtained from external memory, and when page mapping is used, a ZLR (zero length read) unit 614 issues ZLRs before actual read accesses from the external memory 628 to better ensure page map entry updates on one or more page tables. The page tables list virtual to external memory physical address mapping to improve performance and may be stored on external memory/storage device.

Also when the system 600 uses page mapping, a block delay unit 616 applies a delay to a clock of the system or memories so that the ZLR unit 614 will have enough time to update a page map table. If the system 600 does not use page mapping, the system 600 may not have a block delay unit 616.

A pre-write access unit 620 prepares memory address data to retrieve image data from external memory 628 for writing the image data to the rolling cache 640. The pre-write access unit 620 has a write request handler 622 that obtains the pixel data virtual addresses of the input image (current) block from the cache hit unit 609 and initiates the writes to cache. The write request handler 622 receives tile virtual addresses and tile locations to be used to store the current block and indicated by a block locator unit 634 of the rolling cache manager 630. Specifically, and in this example, the request handler 622 compares a current tile address to be used for a current block to tile addresses in the valid table 633. The valid table 633 lists the tiles that are already being used (or occupied) by another block as explained above. Thus, if the current tile address is not listed on the valid table, or the tile is listed as free (with a 0 bit for example), the address is confirmed to be free to be used by the current block being filled or analyzed. If no free tiles exist, then a read request form external memory must be stopped or delayed until tile space frees up. Once the availability of the tiles is confirmed, the read request proceeds while the virtual addresses of the pixel image data of the current block are passed to the virtual to physical address unit 624.

The virtual to physical addr unit 624 converts the received virtual pixel address of the current tiles (or current block) to physical cache addresses of rolling cache 640 to be used for a write operation on the rolling cache. The virtual to physical addr unit 624 may be part of the WR cache unit 632, but could also be part of the pre-write access unit 620 as shown.

If a cache miss occurred, a read request unit 626 may use a finite state machine (FSM) or other circuitry or algorithms to control the status and accesses of the external memory. The read request unit 626 than activates a read from external memory 628 of the missing pixel (e.g., the missing chroma and luma data of the pixels). The requested data is then provided to the rolling cache manager 630 along with the physical addresses for the data from the virtual to physical addr unit 624, and for placement on the rolling cache 640. The read request unit 626 also may handle the ZLR from the ZLR unit 614.

The external memory 628 may be a double data rate dynamic random access memory (DDR DRAM) but could be formed of other memory structures such as Static Random Access Memory (SRAM). The external memory 628 may be any of the external memories mentioned herein.

The cache addresses (whether physical or virtual, whichever is expected) of the input image coordinates, assigned tile virtual addresses, and other image data from the external memory 628 are provided to the rolling cache manager 630. The rolling cache manager 630 has the write (WR) cache unit 632 to perform write accesses, a read (RD) cache unit 646 to perform read accesses as well as to check the status of memory blocks stored on the rolling cache, and a discard/tile tracking (or tracker) unit 631 to track the use of tiles and control discards (or evictions).

In addition to the overlap unit 636, the WR cache unit 632 has the block locator 634 that determines where to put a first block of a sequence from the image processing application, and then where to put subsequent input image memory blocks along a spatial general processing direction, and on the 2D map, and in turn, which tiles will be used to store the current memory block. A rolled tile selector 638 may perform computations that automatically detect when a memory block will extend outside of the edge of the 2D map, and determine where the spatial general processing direction continues on a different edge of the 2D map. This results in selection of roll tiles to place the remainder of the memory block in a second or opposite edge of the rolling cache 640. The selection also establishes the multi-directional feature of the rolling cache 640 since the roll tile selection (or rolling direction of alignment from one edge to another edge of the 2D map) may not be limited to any specific tiles in the 2D map other than to continue the spatial general processing direction.

The overlap unit 636 may receive release signals indicating all processing is compete for a previous block, and therefore the block cannot overlap another block. The release signal may be provided by a release unit 639 in the RD cache unit 646. The overlap unit 636 controls the block overlap need table 618 depending on the release signals. When a release is received about a block being held in the rolling cache 640, the overlap unit 636 will delete or drop the need table 618 of that block.

The local memory or rolling cache 640 may be formed of cache lines, here shown with addresses MEM_0 642 to MEM_N 644. The capacity of the individual cache lines, and in turn tiles, as well as the number of the cache lines in the rolling cache are mentioned above. The memory or cache 640 may be formed by one or more static random access memories (SRAMs) but could be formed by other types of memory hardware. By one approach, the cache 640 may be a local buffer that is located on-board or on-chip with one or more processors that operate the image processing application to perform the image conversions.

By one form, the rolling cache 640 has a size to hold at least four input memory blocks so that space is provided on the 2D map of the continuity of the rolling cache to handle rolling in any direction. Specifically, by one example, this may assume two overlapped blocks are being held and a third block may be added in any direction on the 2D map while a first block is being overwritten.

The RD cache unit 646 has the release unit 639 and a check unit 641. As mentioned, the release unit 639 determines that processing for an output block is complete and the memory block in the cache 640 is not, and will not, be used as an overlap of other adjacent blocks such that this block is no longer needed. This can be determined by monitoring the need tables. Particularly, since an output block size is known in advanced, hardware parameters can be used to monitor the need tables. Once an output block is fully interpolated and filled, the release unit 639 (or other unit of the cache manager 630) checks if the data that corresponds to this output block is needed by other blocks. Since each block has its own need table, the need tables of the other blocks on the rolling cache including a next block may be searched for tiles that were used by the current output block. When an output block is complete, the release unit 639 transmits a release signal or indicator to the overlap (or need table control) unit 636, which then releases the corresponding need table 618 of the input image block that was completed.

When an output block is complete, the check unit 641 checks whether or not a corresponding input memory block is still needed to process other blocks. This may occur due to the overlaps between the blocks resulting from the filter supports of the memory blocks as described herein. The check and release signals (or single signal or indicator) may be provided to the discard/tile track unit 631. The tile track unit 631 controls the valid table 633. The tile track unit 631 may determine which blocks have been both checked and released, and then set the tiles of the checked and released blocks as being discarded or free to be overwritten at the valid table 633.

When a read access is being performed, a pre-read access unit 652 has a virtual address look-up 654 that determines virtual addresses of input image coordinates received from the coordinates upsampling unit 650. The virtual addresses are then converted to physical addresses by a virtual to physical address unit 656, when being used by the cache manager 630. The RD cache unit 646 receives the addresses (virtual or physical) and then performs the read of the addressed tiles. This may include obtaining multiple tiles on a single read access or cycle, such as four tiles forming a rectangular block, but the tiles could be retrieved in any desired combination that can be handled by the system 600. This permits the RD cache unit 646 to retrieve a large area of single memory block stored on the rolling cache, and even may permit the RD cache unit 646 to retrieve data of multiple tiles of an entire block, or even multiple blocks, at a single cycle depending on the system and size of the blocks. The read from the cache is in terms of pixels, but the cache manager allows accessing multiple-tiles at once (to pixels from different tiles). Thus, while the write to cache may be in tiles, the read may be in the window of pixels requested by the interpolation application. The size of the window may be parameterized. One example may be a window of 16×12 pixels to be used to interpolate for four output pixels. Thus, an individual cycle may be used to read support of a 4×4 pixel area for every one of these four output pixels. If one window of 16×12 is not enough, it may take more than one cycle to get the support loaded onto the rolling cache in this example.

The image processing unit 660 may have an interpolation unit 648 that may receive the pixel image data read from the rolling cache 640 for use in interpolation and translation to generate image data for the output pixel locations. As mentioned herein, interpolation may be performed for distortion correction or other image processing tasks, and a different image processing task may be performed instead of that of the interpolation unit 648 when a different image processing application is being used rather than de-warping. The operation of system 600 is provided on example processes 700 and 1300 below.

Figure 7:
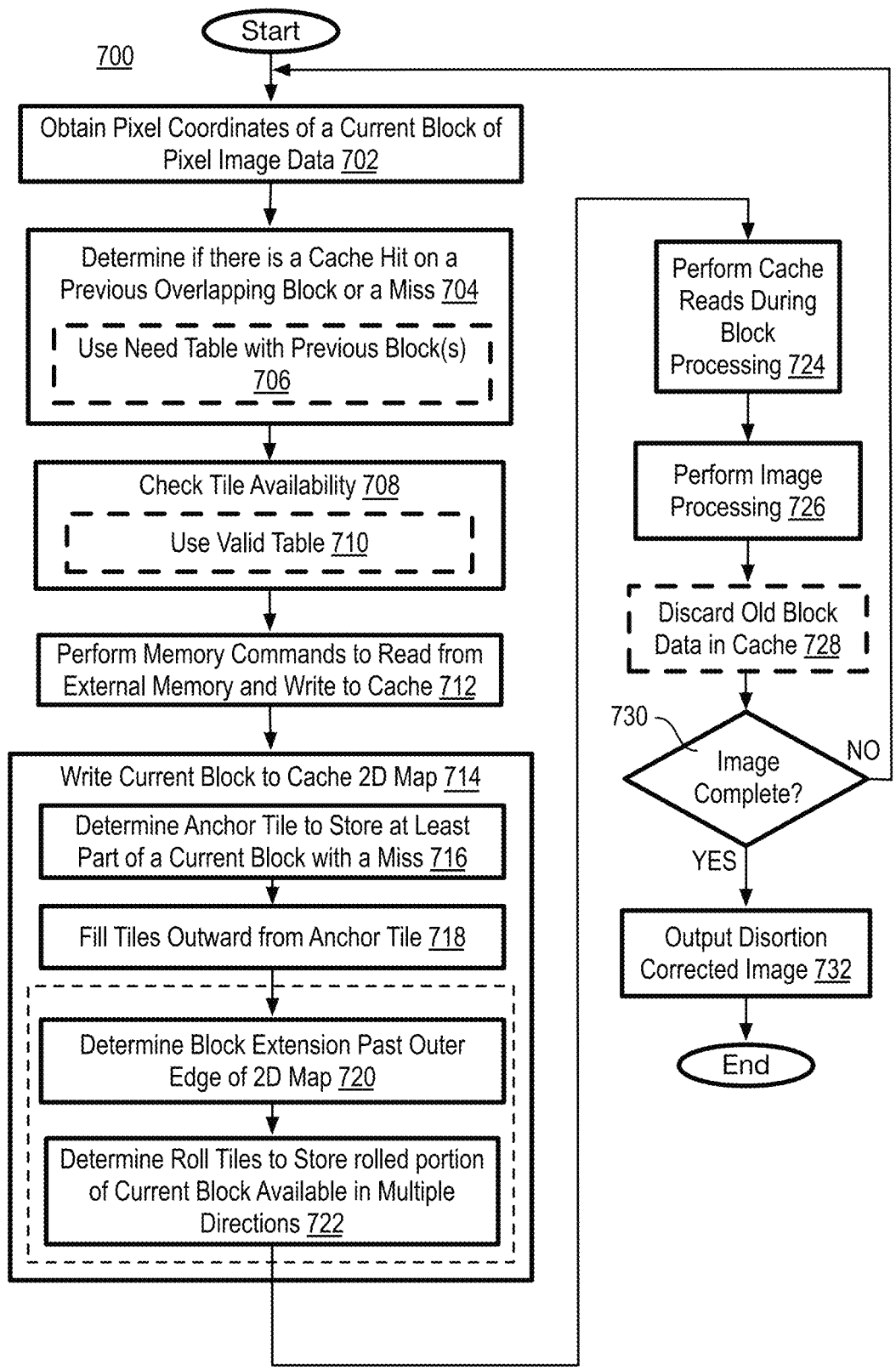
FIG. 7 is a detailed example method of image processing using a multi-directional rolling cache according to at least one of the implementations herein.
Figure 8:
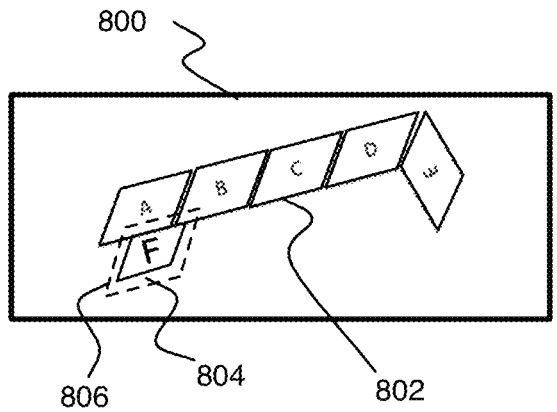
FIG. 8 is a schematic diagram of an input image showing input pixel blocks according to at least one of the implementations herein.

Referring to FIG. 7, an example process 700 of image processing with a multi-directional rolling cache is arranged in accordance with at least some implementations of the present disclosure. In the illustrated implementation, process 700 may include one or more operations, functions or actions as illustrated by one or more of operations 702 to 732 numbered evenly. By way of non-limiting example, process 700 may be described herein with reference to image processing systems or structures 400, 600, 800, 900, 1000, 1100, 1200, and 1800 (FIGS. 4, 6A-6B, 8-12, and 18 respectively) described herein and where relevant.

As a preliminary matter, and by one alternative, the cache described herein could be used as a rolling cache as an alternative mode that is turned off or on by a processor as needed. When turned off, the cache may be used for non-graphics or graphics where it may be found more efficient or provide higher quality for a particular image processing application to use a non-rolling cache, for example.

Process 700 may include "obtain pixel coordinates of a current block of pixel mage data" 702. This first refers to the preliminary operations of forming an input image block of pixel data in a sequence of such input blocks. In the present example, an input image processing application, such as a distortion correction or de-warping image processing application, may proceed to populate a rectangular output block of an array of integer pixel locations with image data, and block by block. The image processing application obtains the output block pixel locations and determines which input pixel locations on the warped image will be used for interpolation and translation to form the image data for the output block.

Figure 12:
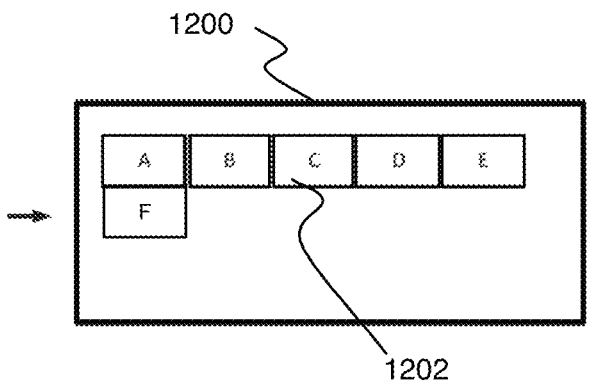
FIG. 12 is another example output image according to at least one of the implementations herein.
Figure 9:
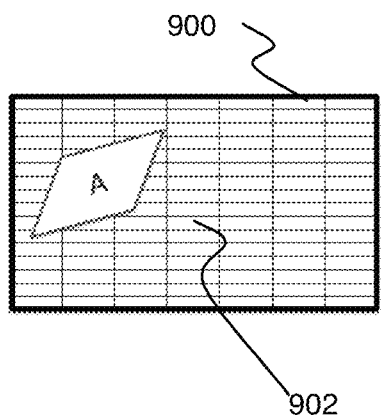
FIG. 9 is a schematic diagram of an example 2D mapping representation of a rolling cache with a first block according to at least one of the implementations herein.
Figure 10:
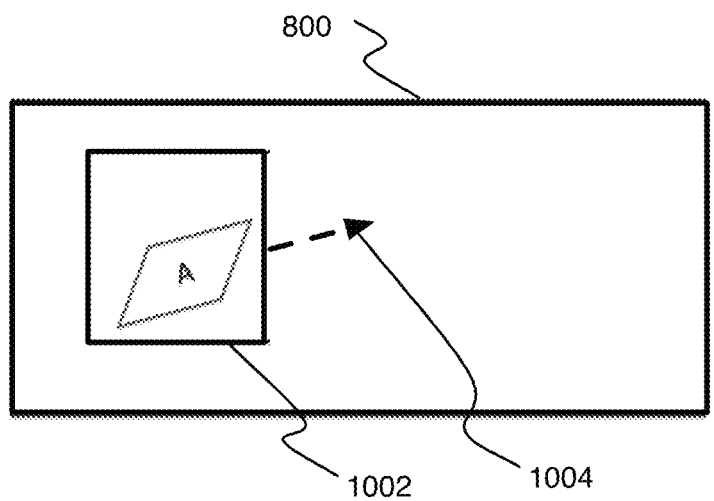
FIG. 10 is a schematic diagram of the example input image of FIG. 8 showing a moving window and processing of a block according to at least one of the implementations herein.
Figure 11:
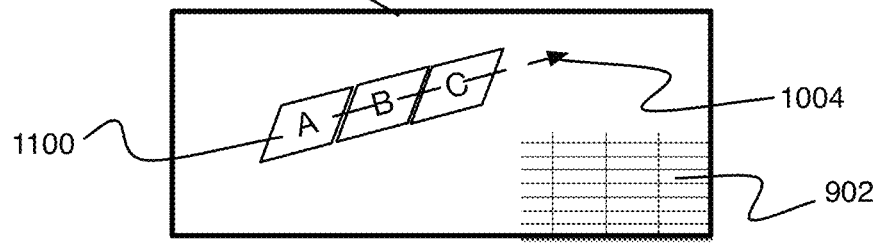
FIG. 11 is a schematic diagram of the example rolling cache of FIG. 9 with subsequent blocks according to at least one of the implementations herein.

For example, an input image 800 (FIG. 8) has a set 802 of tetragonal blocks A-F to be de-warped by converting the blocks A-F into rectangular blocks 1202 on an output image 1200 (FIG. 12). Referring to FIGS. 9-11, a block A is fetched from external memory and written to a 2D map 902 of tiles forming a rolling cache 900. It is assumed the image processing application will request read from the external memory the blocks in order of: A-B-C-D-E-F. Each input block corresponds to an M×N output block size. The input image processing application may move a window 1002 along the input image 800 with block A where the window 1002 covers a pixel area of the input image 800 that is to be analyzed and will cover areas with subsequent blocks to be processed as the window moves. With the movement of the window 1002 along the spatial general processing direction 1004, the next blocks to show in the window will be block B, and thereafter block C (as shown on FIG. 8). The blocks, block by block, may be placed onto the rolling cache 900 as shown on FIG. 11 where the spatial general processing direction 1004 from the processing of blocks in input image 800 (FIG. 10) is maintained on rolling cache 900 (FIG. 11).

The initial determination of input pixel locations to be used for the interpolation may form a memory block of non-integer input pixel locations that includes filter support or margin pixel locations. Block F on input image 800 is shown with the filter support 804 (shown in dashed line) to form a larger memory block 806. The formation of the memory block for each block A-F may include selecting a small sample of the input pixels on the warped input image to be used to form an output block, and then upsampling those pixel locations to complete the memory block. It will be appreciated that other variations may be used instead such as other types of image processing applications or varying types, shapes or sizes, of input pixel image blocks in addition to the tetragons.

The image processing application may proceed to generate a sequence of the input image memory blocks, where a previous block in the sequence may overlap with a current block in the sequence particularly due to the filter support but could be overlapping even without the filter support. The selection of the blocks in the sequence inherently forms a spatial general processing direction of blocks to be placed in memory as the image processing application generates (or places) one memory block to overlap an adjacent previous memory block on the input image. Note below that the terms block and memory block may be used interchangeably below, and both refer to the memory block being stored on the rolling cache for this example using de-warping unless the context suggests otherwise.

Process 700 may include "determine if there is a cache hit on a previous overlapping block or a miss" 704. This operation may be performed by the cache hit unit 609 of system 600 (FIG. 6A) and may preliminarily include calculating cache virtual pixel addresses for the input image pixel coordinates of the current block (or current memory block). This may include the use of a valid table that lists the tiles already being used by other blocks. By one form, the input pixel locations are assigned to tiles that are not listed on the valid, or are listed as free on the valid table. By one example form, the valid table lists an occupied bit for each tile on the rolling cache. The virtual address values may be assigned to pixels according to an algorithm such as a standard or technique, for example NV12 format.

A cache search then commences to compare the virtual addresses of the pixel locations of the current block and the pixel locations of one or more previous blocks already stored on the rolling cache. The number of previous blocks to be compared to the current block is configurable. For this operation, an overlap unit 636 may control or read a block overlap need table (or need tables) 618 that may store, by one form, a need table for each previous block already on the rolling cache.

Thus, when block overlaps are being tracked, this operation optionally may include "use need table with previous block(s)" 706. Here, the overlap unit 636 may generate a need table, such as need table 618 as described above, for the current block of input pixel locations and by using the virtual addresses from the virtual address look-up unit 610. The overlap unit 636 drops the need tables for a previous block when it receives a release signal as described above with system 600 and that indicates the processing of the previous block is complete and cannot be overlapped. Also as mentioned, the release signal may originate from the RD cache unit 646.

The determination as to whether a cache hit or miss occurs then may be determined by a search of the need tables. Specifically, this involves comparing the need table of the current block to the need table of one or more of the previous blocks, and particularly, the pixel coordinates as represented by the virtual addresses of both tables may be compared. When a cache hit occurs, those pixel locations found on both the current block and a previous block are maintained on the rolling cache and are not fetched from external memory.

Once the tiles are assigned and a cache miss indicates that pixel image data should be obtained from external memory, process 700 then may include "check tile availability" 708. This may include "use valid table" 710. The valid table 633 lists which tiles are already being used and cannot be used by a current block. A discard/tile tracker unit 631 may control the valid table 633 by receiving release and check signals that indicate respectively, that processing is complete for a block that has data in a particular tile, and the data in the tile is not needed for processing of any adjacent blocks, as described above with system 600. If also listed, the tiles that are free to use for writing may be indicated on the valid table 633 by the bits in the table that are not set (='0' for example). If the valid table indicates no free tiles exist in the cache, then no RD request is sent for the missing image data, and the request should be delayed. By one form, the RD request may only be activated when free tiles exist in the cache. The system works by relying on the assumption that when data arrives from external memory, it will always have free tiles to fill in the rolling cache.

To assign the tiles then, a write request handler 622 reads the valid table 633 to determine which tiles are being used already so that it is clear which tiles are free tiles to use to store the current block being processed.

Process 700 then may include "perform memory commands to read from external memory and write to cache" 712, and when a cache miss has occurred. Here, the read request unit 626 (FIG. 6) may determine external memory addresses, if not using the virtual addresses already generated, to retrieve the missing image data from external memory. A WR cache unit 632 thereafter writes the missing data to the rolling cache 640. The tile addresses are already selected by the block locator 632 and retrieved from the valid table 633 as mentioned above.

Otherwise, process 700 may include "write current block to cache 2D map" 714, and this operation may include a number of sub-operations described below including both overlap-related operations and the rolling operations as follows.

When the pixel data on the need table of the current block is not on a previous need table, then a MISS occurs and this missed data may be fetched form external memory to be placed on the rolling cache. By one form, only the missed data is fetched from external memory and placed on the rolling cache. The missing data may be certain image data (chroma and luma, for example) of pixel locations, whether consecutive or scattered pixel locations that may be very small areas of a current block, one or more continuous portions of a block, or even most of a block or an entire block. No limit exists as to the size and shape of the miss or overlap area of a block being read from external memory and written to the rolling cache.

Of course, it will be understood that a processor operating the image processing application may simply then obtain the missing data directly from the external memory instead of placing the data in the rolling cache. In the present system and method, however, the missing data may be placed in the rolling cache anyway in case subsequent blocks overlap the current block and may need the data of the missed block data.

Process 700 may include "determine anchor tile to store at least part of a current block with a miss" 716. In this example, the block locator unit 634 may indicate which cache tiles are to be used to store a current block being processed. This is determined by using the valid table that at least lists the tiles that are being used. Those tiles not on the list, or indicated as free on the list, may be used for a current block. This may be indicated by a single bit binary flag for example or other indicator on the valid table. The storage of the block is assigned a first anchor tile at a key location on the block, such as the upper left corner of the block. If the cache is clean and the first block of an input image is being stored, the anchor tile may be randomly selected on the 2D map of the rolling cache or may be selected based on an assumption or finding that processing typically and generally proceeds block by block form left to right, for example. In this case, the anchor tile may be on or nearer a left edge of the rolling cache than a right edge. Other findings may be used instead. Also, when the block is not a first block on the rolling cache, the anchor tile may be placed where pixel locations overlap a pervious block as mentioned where no new pixel image data is going to be stored and is already on the 2D map of the rolling cache.

Process 700 may include "fill tiles outward from anchor tile" 718, where the remaining tiles to hold the current block will be assigned tile by tile as the pixel coordinates for the current block extend away from the anchor block on the 2D map of the rolling cache. As with the anchor block, the subsequent tiles may be placed where pixel locations overlap a pervious block as mentioned and where no new pixel image data is going to be stored since the data is already on the rolling cache. The tile assignments are continued until the entire current block is assigned to tiles.

Figure 13:
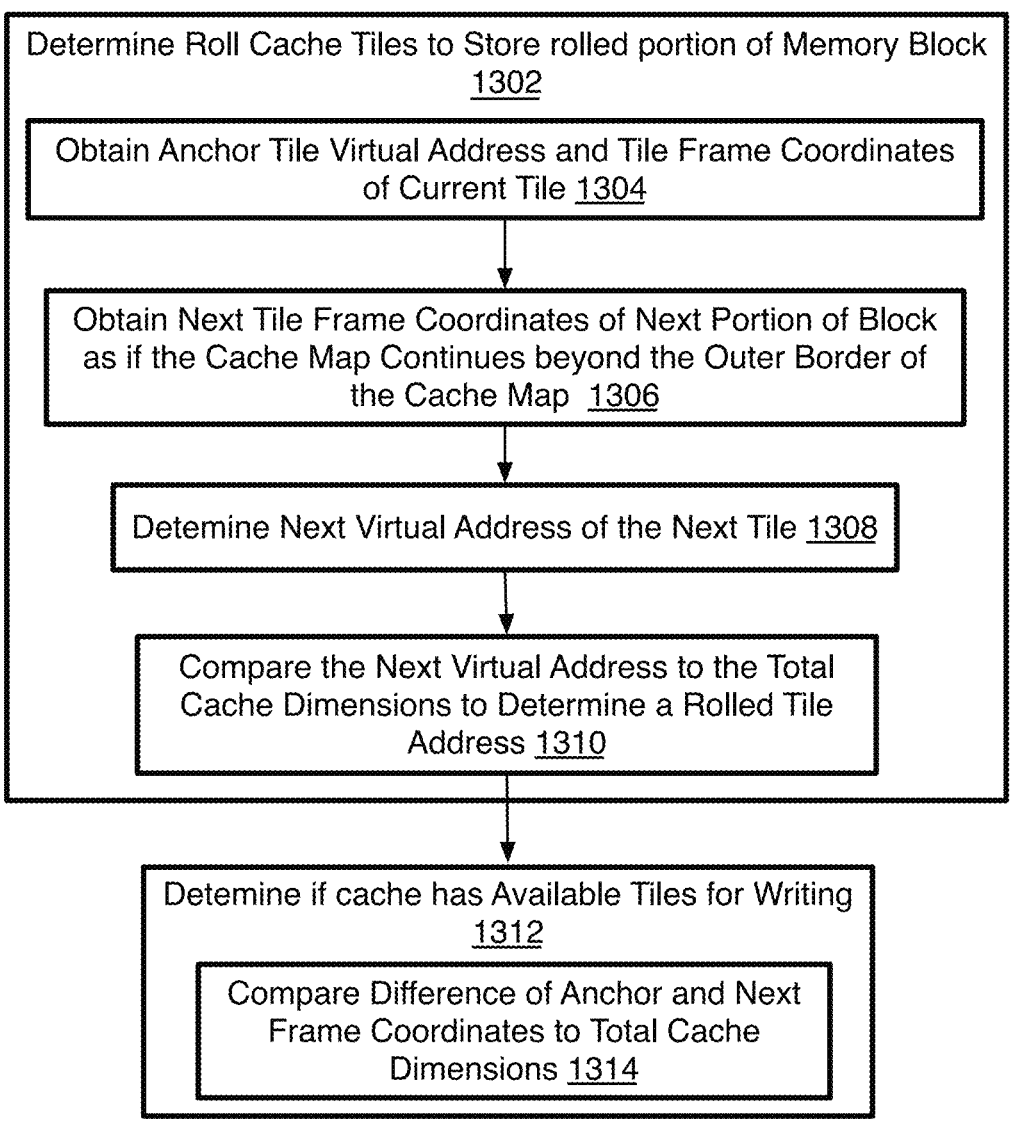
FIG. 13 is a detailed method of determining cache roll tiles to store rolled block portions on a multi-directional rolling cache according to at least one of the implementations herein.

Due to the continuity feature of the rolling cache, some tiles will not fit on the rolling cache 2D map. Thus, process 700 may be considered to include "determine block extension past outer edge of 2D map" 720, and "determine roll tiles to store rolled portion of current block available in multiple directions" 722. As input image data blocks are being placed on the rolling cache, the blocks are positioned along an inherent spatial general processing direction established by the selection and location of the blocks by the image processing application. The methods herein have the ability to automatically and simultaneously determine when the direction has reached an outer edge (or border or boundary) of the 2D map of the rolling cache and where to continue storing a remainder of a block and/or subsequent blocks at another point on the outer edge (or on another outer edge when the 2D map can be described as having multiple sides, and in turn an edge at each side, for example). This involves the use of equations and the continuity of the rolling cache to compute roll tile addresses on a second or another edge of the 2D map so that the spatial general processing direction can continue in the same direction as from an initial, first, or one edge of the 2D map. The rolling can be implemented by using the virtual addresses and whole image-based (or whole frame)-based addresses of the tiles. The details of the rolling operation are provided below with process 1300 (FIG. 13).

Process 700 may include "perform cache reads during block processing" 724. This involves obtaining the input image blocks with input pixel image data, including input pixel coordinates, which is the same data provided for writing to the rolling cache. Thereafter, virtual addresses of the pixel image data are generated for the input pixel image data of a block. The virtual addresses may be converted to physical addresses when rolling cache uses the physical addresses. The RD cache unit 646 then reads the requested block using the addresses (whether virtual or physical) and then provides the read block for processing. So, process 700 then may include "perform image processing" 726, where the image processing application uses the input image (or intermediate image data) of the current block. As mentioned for distortion correction, this may include interpolation, over multiple iterations when desired, and translation to output pixel coordinates to form rectangular blocks (FIG. 12).

Thereafter, process 700 may include "discard old block data in cache" 728, where setting a tile as invalid, or removing it from the valid table, effectively discards the old data of tile. This acts to erase the data from the tile and to discard old data in that tile since the system is now free to overwrite the old block data in the tile. This may be indicated by a bit that is set to 0 for example to indicate when an address is free to be used, although 1 or other code could be used instead.

Process 700 may include the inquiry "image complete?" 730. If not, the process loops back to operation 702 to obtain a next input image block. Otherwise, process 700 may include "output distortion corrected image" 732, where the completed output image is provided by the image processing application and system.

It should be noted multiple blocks can be processed in parallel when a processing pipe being used has several stages as mentioned: calculating the IPL-OPL mapping, up-sampling coordinates and finding a cache Hit-Miss, data fetches, cache reads, and interpolation. Each of the stages can work on another block. For example, while block N may be fetched from external memory, block N−1 may be in cache Hit-Miss operations, and block N+1 may be in the output stage which includes cache RD and interpolation. The method also is flexible because it can apply to many different input block sizes even though the output blocks may be the same size.

Referring to FIG. 13, an example process 1300 of image processing with a multi-directional rolling cache is arranged in accordance with at least some implementations of the present disclosure. In the illustrated implementation, process 1300 may include one or more operations, functions or actions as illustrated by one or more of operations 1302 to 1314 numbered evenly. By way of non-limiting example, process 1300 may be described herein with reference to image processing systems or structure 400, 600, 1400, 1500, 1600, 1700, and 1800 (FIGS. 4, 6A-6B, 14-17, and 18 respectively) described herein and where relevant.

Process 1300 may include "determine roll cache tiles to store rolled portion of memory block" 1302, and determined in any direction as processing proceeds from one block to another along a relatively random spatial general processing direction determined by the image processing application. This involves a number of the following operations.

Process 1300 may include "obtain anchor tile virtual address and tile frame coordinates of current tile" 1304. The anchor or first tile of a block to be placed on the rolling cache is as described above. By one form, a tile virtual address, or part of the tile virtual address, are the tile coordinates or tile position in the 2D map provided by the rolling cache. As an alternative, a key tile of a block that is other than the first or anchor tile of the block could be used instead of the anchor tile.

Figure 14:
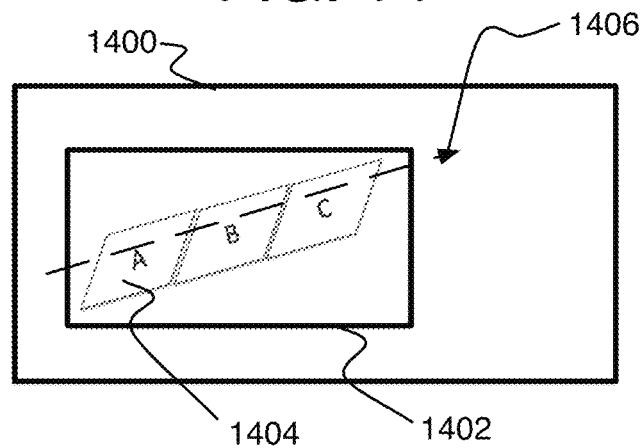
FIG. 14 is another example 2D mapping representation of rolling cache according to at least one of the implementations herein.
Figure 15:
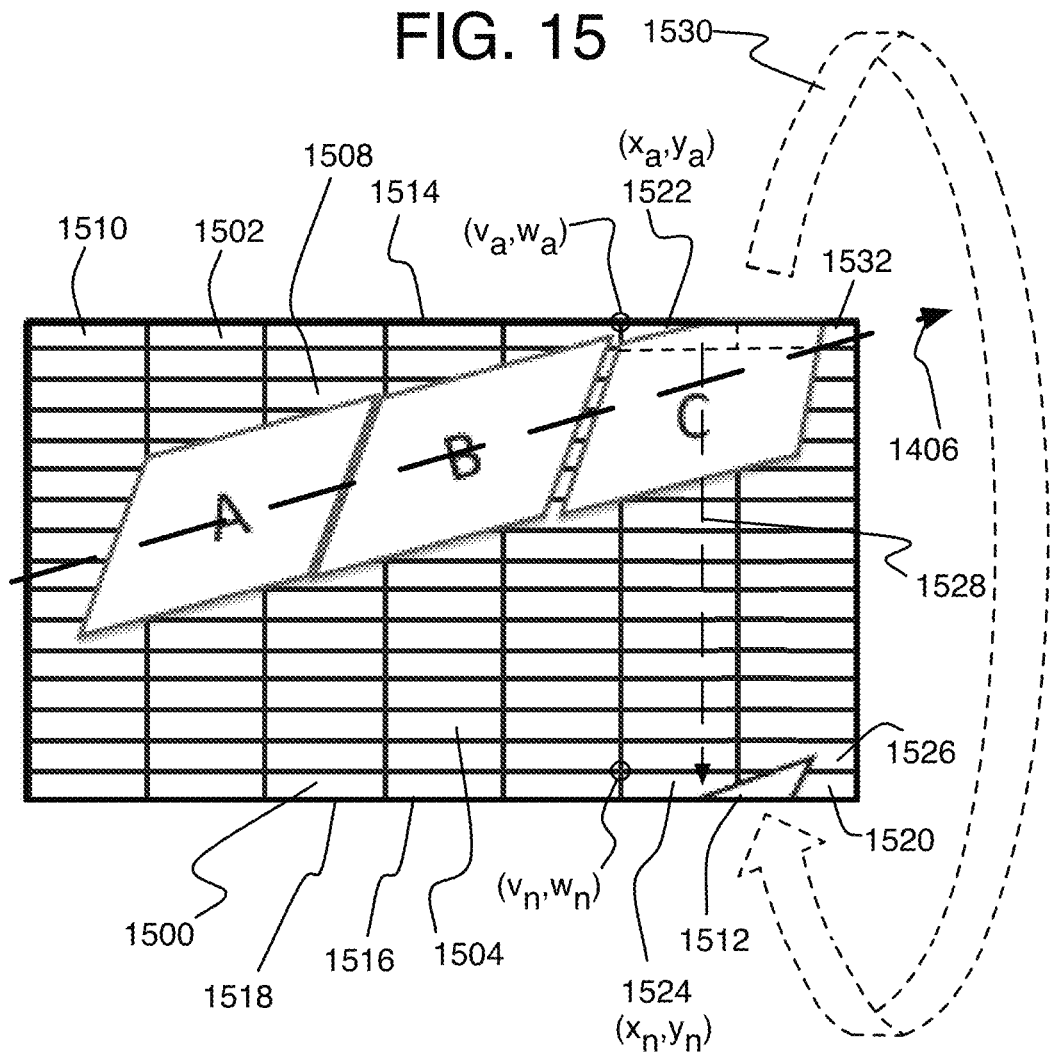
FIG. 15 is an example input image used on FIG. 14 according to at least one of the implementations herein.

Referring to FIGS. 14-15 for example, an input image 1400 is shown with a moving processing window 1402 that moves along the input image 1400 to indicate the direction of processing, as controlled by an image processing application as described herein. The window 1402 indicates an order of input image pixel blocks to be processed here being, in order, A, B, and C as the window moves to the right in the image 1400. The motion of the window, and in turn the processing, generally defines a spatial general processing direction 1406 that can be used as a direction for storing the blocks A-C on a rolling cache 1500.

In order to store the blocks A-C in the local buffer or rolling cache 1500, the rolling cache 1500 is shown with a 2D map 1502 of tiles 1504 here arranged in 16 rows and 7 columns (chosen randomly for this example), and with a sequence of blocks 1506, such as the blocks A-C. Here blocks A-C are memory blocks including any filter support. Many different arrangements could be used as well including different number of columns and/or rows, and placement of the tiles in other than rows and columns.

The virtual address of each tile 1504 is, or includes, the numbering of the tiles 1504 in the 2D map. Thus, the upper left tile 1510 may have a virtual address of (0, 0) while a lower right tile 1520 may have the highest virtual address (6, 15) as this random example for a cache size (or dimensions) to 7×16 tiles. As shown for block C on cache 1500, the entire block C does not fit on the 2D map, and the block C would extend past and outside the outer edge of the 2D map such as upper edge 1506. The extended portion 1512 is to be rolled (as already shown by arrow 1530) from an upper outer edge 1514 of the 2D map 1502 to a lower outer edge 1516 of the 2D map 1502 that both form parts of the total rectangular frame-shaped outer edge 1518 of the 2D map 1502. The system can determine which roll tiles to use on the other side or edge 1516 of the 2D map 1502 to store the extended portion of block C. This may include obtaining the anchor tile virtual address $(x_a, y_a)$ of an anchor tile 1522 of the block C where x=0 to X and y=0 to Y to form a tile virtual address index (x, y). The anchor tile 1522 has the anchor or first pixel where the anchor pixel is set at the upper left corner pixel location of the block, but could be set at other points on the block C. Thus, in this example, tile 1522 has the upper left corner of memory block C and is therefore the anchor tile for block C with its upper corner set at the anchor tile virtual address $(x_a, y_a)$.

The frame coordinates of the anchor tile 1522 is $(v_a, w_a)$ where v=0 to V and w=0 to W to form an index (v, w). The frame coordinates may be set at a particular point on all tiles, such as the upper left corner of each tile. The tile frame coordinates provide the position of a tile relative to the whole frame or image, or in other words, relative to pixel position (0,0) at the upper left corner of the image. Since the total cache size in total pixels is usually much smaller than the image size, the same tile is reused at different image or frame pixel addresses.

The tile frame coordinates may be computed in a number of different ways. One way is to divide the image by the number of tiles to form the tile frame coordinates index (v, w) that is a count of the tiles from the upper left corner of the image. Thus, as a preliminary operation, the frame can be separated into tiles and each tile can be given a frame index location (v, w) as follows:

$$(v, w) = \left( \frac{\text{frame\_width}}{\text{tile\_width}} - 1, \frac{\text{frame\_height}}{\text{tile\_height}} - 1 \right) \quad (1)$$

where frame_width, frame height, tile_width and title_height are all in pixel amounts here. The tile frame coordinates of a block portion about to be stored may be determined by using the input image pixel coordinates being stored, and assigning the coordinates $(v_n, w_n)$ that is the closest tile keypoint (such as upper left corner of a tile) to the input image pixel coordinates lower and to the right of the keypoint and to be stored (and above and to the left the next tile key point on the input image). As an aside, the tile frame coordinates (v, w) may be translated into a real (virtual) memory address when needed to access the memory, such as by:

$$(x, y) = \text{base\_addr} + (w^* \text{tile\_height}^* \text{stride}) + (v^* \text{tile\_width}) \quad (2)$$

where base_addr is the anchor virtual address $(x_a, y_a)$, is configured from software, and indicates to the cache where the full input frame is located. The stride is indicating how many addresses need to be jumped between two adjacent lines in memory.

Process 1300 may include "obtain next tile frame coordinates of next portion of block as if the cache map continues beyond the outer border of the cache map" 1306. Thus, the next tile frame coordinates are determined as with any of the tile frame coordinates mentioned and while ignoring, or regardless of, the outer border or boundary (or edge) of the 2D map. The next tile input image frame coordinates may be set as $(v_n, w_n)$.

Process 1300 may include "determine next virtual address for the next tile" 1308. The next tile virtual address $(x_n, y_n)$ is the anchor tile virtual address plus the difference between frame coordinates of the anchor tile and next tile being added. This may be determined by:

$$(x_n, y_n) = (x_a, y_a)(v_n - v_a, w_n - w_a) \quad (3)$$

This equation is true when the difference between the virtual addresses and difference between the frame coordinate positions from anchor tile to next tile must be the same distance where $(x_n - y_a, y_n - y_a) = (v_n - v_a, w_n - w_a)$ must exist. It should be appreciated, however, this may not be true when the next tile address is "wrapped around" into the case dimension. This occurs when the next address is seemingly outside the rolling cache. This cannot actually happen so that the next address may be wrapped around into the cache in a way that creates continuity between the end and the start of the cache (rolling cache). Thus, if a last horizontal address is N, the next address is 0. This also may be true for the opposite direction (before 0 the address is N) and for the vertical case.

Process 1300 may include "compare the next virtual address to the total cache dimensions to determine a rolled tile address" 1310. If the current or next tile virtual address is larger than the cache dimensions, then the portion of the block being placed on the rolling cache is past and outside of an outer edge of 2D map of the cache. In this case, the next tile virtual address is modified to roll or wrap the over-extended block portion to another tile address that is located at or near, or otherwise relative to, a different outer edge of the 2D map. This can be expressed as the following equations:

If $x_n >$cache_width:

$$x_n = x_n - \text{cache\_width} \quad (4)$$

If $y_n >$cache_height:

$$y_n = y_n - \text{cache\_height} \quad (5)$$

where cache_width and cache_height are in an amount of tiles. This equation automatically repositions the next tile as a roll tile on another edge of the 2D map and while maintaining the spatial general processing direction established by the image processing application and that extends out of the one or first edge of the 2D map.

Referring to FIG. 15 again for example, block C has an extended portion 1512 that will not fit within the rolling cache at first and would extend past and outside of the upper edge 1514 of the 2D map 1502. Next tiles 1520, 1524, and 1526 will store the block portion 1512. Initially, the computations above of equations (1) to (3) may use the anchor tile 1522 to compute the virtual addresses $(x_n, y_n)$ of the next tiles (not shown) to be outside of the upper edge 1514. Then, equations (4) and (5) may be used to roll or wrap the portion 1512 to change the next tiles to next tiles 1520, 1524, and 1526 at the lower edge 1516 of the rolling cache 1502. Arrow 1530 generally depicts this rolling motion while arrow 1528 represents the rolling direction of alignment on the 2D map 1502 and from the tile (here 1522) at the first edge 1514 and roll tile 1524 at the second edge 1516 to represent a continuous surface between the two tiles 1522 and 1524. The rolling directions described anywhere herein are shown across the face of the 2D maps from edge to edge of the maps and are not necessarily in the same direction as the inherent general image processing direction as shown on 2D map 1502. It also should be noted that the block portion 1512 is positioned on the 2D map 1502 so as to maintain the spatial general processing direction 1406 to be heading in the same general direction as the processing of block C.

As another example, say the total cache dimensions are 12×8 tiles with virtual addresses of (0,0) to (11,7), and say:
   $(v_a, w_a) = (10,10)$ (anchor tile frame coordinates)
   $(x_a, y_a) = (8, 7)$ (anchor tile virtual address)
   $(v_n, w_n) = (16, 10)$ (next tile frame coordinates), and
   $(v_n - v_a, w_n - w_a) = (6, 0)$ In this case, applying equation (4) above, next tile virtual address $(x_n, y_n) = (8, 7) + (6, 0) = (14, 0)$. However, 14 is larger than the horizontal (column) cache dimension 12. So in this case, next tile virtual address $(x_n, y_n)$ may be modified (or wrapped) to determine a rolled tile virtual address at or near another edge of the rolling cache in order to maintain the next tile on the 2D map of the rolling cache. So by this example, if maximum virtual address horizontal index is 11 (for a total of 12 tiles), the adjusted $x_n$ is (14−12) from equation (5) above, so the modified or rolled next tile virtual address index $(x_n, y_n)$ is (2, 7) rather than (14, 7). The equations above for rolling the image data not only determines a rolled next tile to efficiently maintain the blocks on the cache, the equations also use the continuity of the rolling cache to maintain the spatial general processing direction for storing the blocks on the cache to process the blocks in a desired order and maintained in a desired direction.

Referring to FIGS. 16-17 a more complex spatial general processing direction 1606 is generated by an image processing application and that has a bend in it. An input image 1600 shows a moving window 1604 of the image processing application that establishes the spatial general processing direction 1606 as the window 1604 moves right to process a block sequence A-E as shown where block E is not linear to the other blocks.

A rolling cache 1700 has a 2D map 1702 formed of tiles 1704 arranged in rows and columns to store the memory blocks A-E as shown. Block C has a main portion 1708 and an extended, and then rolled, portion 1710 that is rolled along rolling direction 1709 as described with rolling cache 1500 (FIG. 15). Thereafter, block D is broken into four parts for storage on the rolled cache 1700 by using the continuity of the rolling cache 1702. The portion 1712 of block D with its upper left corner generally may be stored first on an anchor tile (depending on the exact pixel location). The process then may store the remainder of Block D using the tile selection equations described above. Here, a lower left corner portion 1714 of block D may be rolled as shown by rolling direction arrow 1713 and back to the top of the 2D map 1702. A right upper corner portion 1716 of block D may be rolled along rolling direction arrow 1715 and stored on the left edge of the 2D map 1502 to continue the right edge of the 2D map. A lower right corner portion 1718 of block D may be rolled to the upper and left edges of the rolling cache 1702 from either or both the lower edge of the rolling cache along rolling arrow 1717 and/or the right edge of the 2D map along rolling direction arrow 1719. Likewise, an upper portion 1720 of block E was then first stored along a lower edge of the 2D map while a lower portion 1722 of the block E is rolled to the upper edge of the 2D map. Storing the blocks in this way maintains the spatial general processing direction 1606 as established by the image processing application performing the image processing.

Thereafter, it may be determined whether or not the now next rolled tile $(x_n, y_n)$ is already occupied with data. Thus, process 1300 may include "determine if cache has available tiles for writing" 1312. This operation may include "compare difference of anchor and next frame coordinates to total cache dimensions" 1314. Specifically, if the difference between anchor and next tile frame coordinates $(v_a - v_n, w_a - w_n)$ is larger than the cache dimension in the number of tile rows and columns, then no (or insufficient) free space exists in the rolling cache, and the rolling cache manager waits for the release of blocks, and in turn tiles, as described above. By the current form, the rolling cache only stores the next portion of a block when the computed next tile $(x_n, y_n)$ has been discarded. By an alternative form, however, any tile opening is used, and the sequence of tiles being processing along a spatial general processing direction is re-positioned at the open tile, and may involve breaking or interrupting the overlaps of block to block.

For example, any one or more of the operations of the processes in FIGS. 5, 7, and 13 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic and/or firmware logic configured to provide the functionality described herein. The software may be embodied as a software package, code and/or instruction set, and/or firmware that stores instructions executed by programmable circuitry. The modules may, collectively or individually, be embodied for implementation as part of a larger system, for example, an integrated circuit (IC), system on-chip (SoC), and so forth.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the systems discussed herein. Further, one of ordinary skill in the art will appreciate that operations performed by hardware and/or firmware may also utilize a portion of software to implement the functionality of the logic unit.

As used in any implementation described herein, the term "engine" and/or "component" may refer to a module or to a logic unit, as these terms are described above. Accordingly, the term "engine" and/or "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 18:
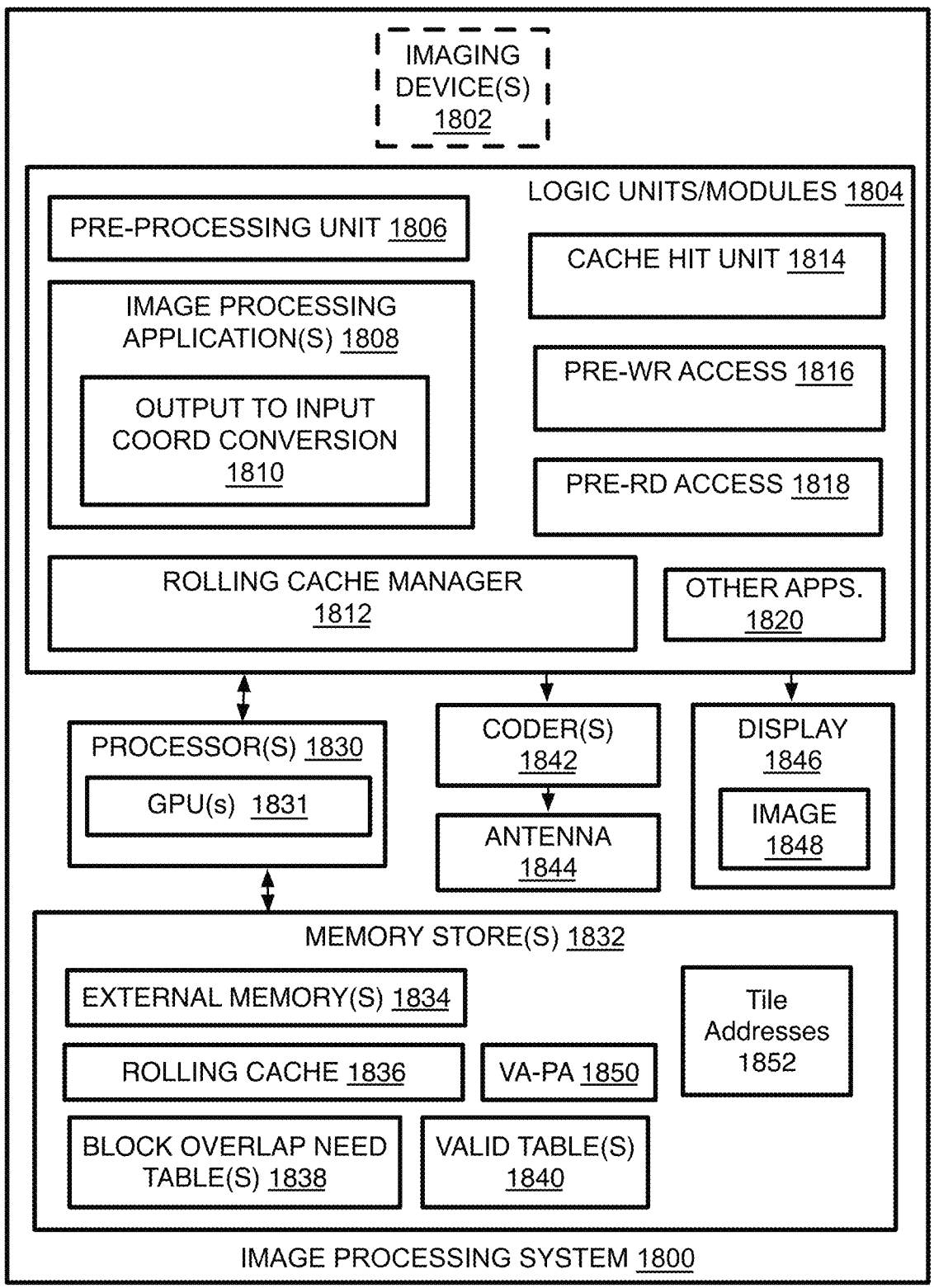
FIG. 18 is an illustrative diagram of an example system to perform a method of image processing according to at least one of the implementations herein.

Referring to FIG. 18, an example image processing system 1800 is arranged in accordance with at least some implementations of the present disclosure. In various implementations, the example image processing system 1800 may have or be one or more imaging devices 1802 to form or receive captured image data. Thus, in one example form, imaging device 1802 may include camera hardware and optics including one or more fisheye, wide angle camera, or ultra-wide angle camera, each having corresponding lenses.

Whether captured image data from a camera or image data obtained from a memory, logic modules 1804 may receive the image data and may include a pre-processing unit 1806 to process raw image data, one or more image processing applications (1808) that may have an output to input coordinate conversion unit 1810 as described herein. A rolling cache manager 1812 to manage a rolling cache 1836, as well as a cache hit unit 1814, a pre-WR access unit 1816, and a pre-RD access unit 1818, any of which may be or may not be considered as part of the rolling cache manager 1812.

Other applications 1820 that can use modified images from the image processing application(s) 1808, as well as both graphics-related and non-graphics related applications may be provided as well.

A coder 1842 may encode video sequences of the image data for transmission or decode received video sequences of the image data. Also, the image processing system 1800 may have one or more processors 1828 to operate the logic modules or units 1804 and which may include one or more graphics processing units (GPUs) 1831 and/or image signal processor(s) (ISPs), such as the Intel Atom, memory stores 1832, one or more displays 1846, and antenna 1844. In one example implementation, the image processing system 1800 may have the display 1842, at least one processor 1828 communicatively coupled to the display, and at least one memory 1832 communicatively coupled to the processor.

The memory store(s) 1832 may include at least one of each of an external memory 1834, the rolling cache 1836, a block overlap need table(s) 1838, a valid table 1840, a virtual address to physical address (VA-PA) table or unit 1850, and a tile address table 1852 storing cache tile cache addresses, cache tile frame addresses, or both. The use of these memories or storage is as described in any of the systems or methods described above.

As illustrated, any of these components may be capable of communication with one another and/or communication with portions of logic modules or units 1804 and/or imaging device 1802. Thus, processors 1828 may be communicatively coupled to both the image device 1802 and the logic units/modules 1804 for operating those components.

By one approach, although image processing system 1800, as shown in FIG. 18, may include one particular set of modules, units, or components associated with particular actions or operations as already described above, and indicated or suggested by the label of the unit. Thus, each of the components, units, or modules described for image processing system 1800 may perform the operations mentioned for any of the methods described above where the operation is associated with the title of the module, unit, of component. However, these modules, units, and components are not necessarily always limited to those operations and actions. Operations or actions may be associated with different components or modules than the particular component or module illustrated here.

Figure 19:
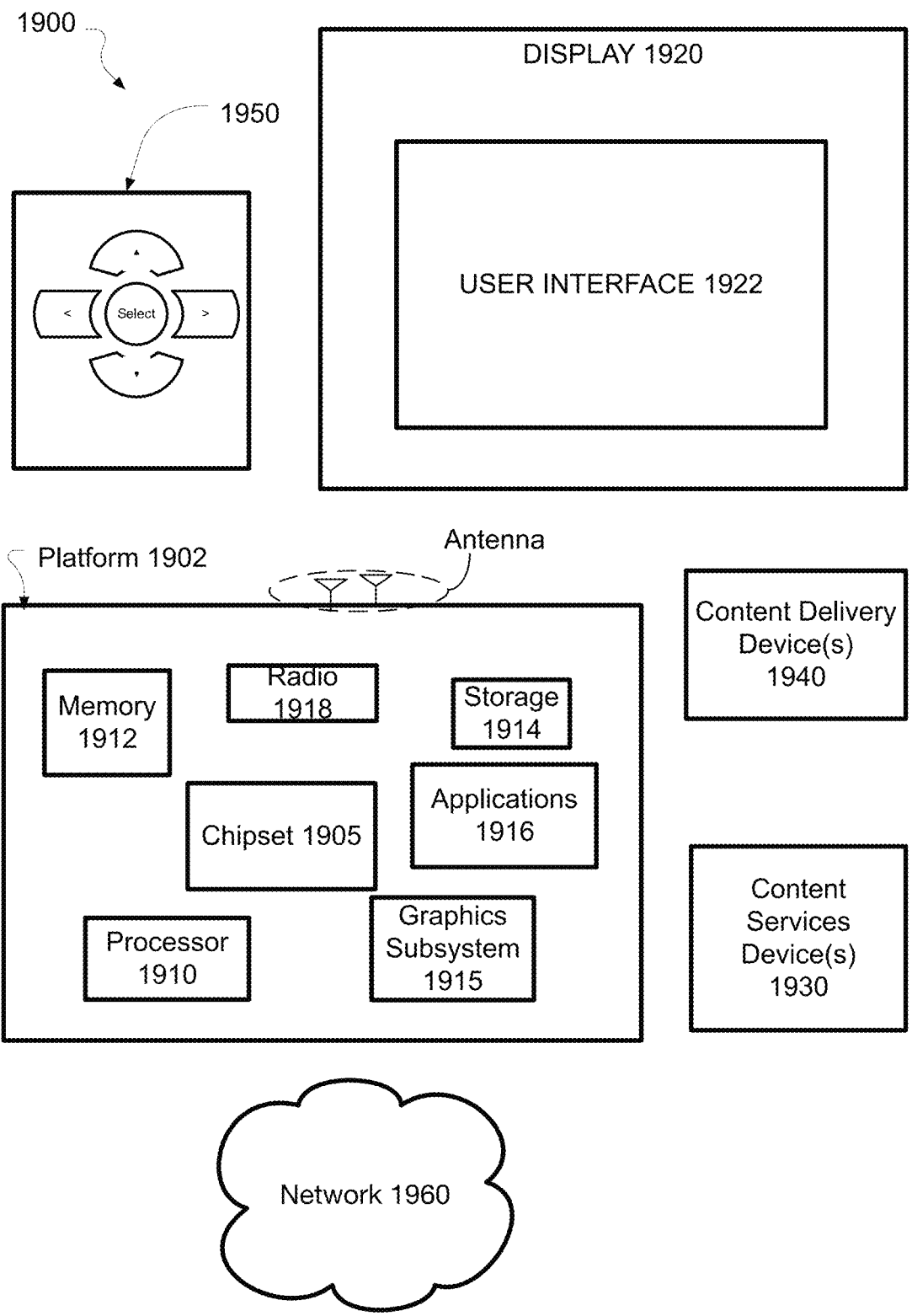
FIG. 19 is an illustrative diagram of another example system.

Referring to FIG. 19, an example system 1900 in accordance with the present disclosure operates one or more aspects of the image processing system 1200 described herein. It will be understood from the nature of the system components described below that such components may be associated with, or used to operate, certain part or parts of the image processing system described above. In various implementations, system 1900 may be a media system although system 1900 is not limited to this context. For example, system 1900 may be incorporated into a digital still camera, digital video camera, mobile device with camera or video functions such as an imaging phone, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1900 includes a platform 1902 coupled to a display 1920. Platform 1902 may receive content from a content device such as content services device(s) 1930 or content delivery device(s) 1940 or other similar content sources. A navigation controller 1950 including one or more navigation features may be used to interact with, for example, platform 1902 and/or display 1920. Each of these components is described in greater detail below.

In various implementations, platform 1902 may include any combination of a chipset 1905, processor 1910, memory 1912, storage 1914, graphics subsystem 1915, applications 1916 and/or radio 1918. Chipset 1905 may provide intercommunication among processor 1910, memory 1912, storage 1914, graphics subsystem 1915, applications 1916 and/or radio 1918. For example, chipset 1905 may include a storage adapter (not depicted) capable of providing intercommunication with storage 1914.

Processor 1910 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1910 may be dual-core processor(s), dual-core mobile processor(s), and so forth.

Memory 1912 may be implemented as a volatile memory device such as, but not limited to, a Random Access Memory (RAM), Dynamic Random Access Memory (DRAM), or Static RAM (SRAM). The external memory and rolling cache described herein both may be memory 1912.

Storage 1914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1914 may include technology to increase the storage performance enhanced protection for valuable digital media when multiple hard drives are included, for example.

Graphics subsystem 1915 may perform processing of images such as still or video for display. Graphics subsystem 1915 may be a graphics processing unit (GPU) or a visual processing unit (VPU), for example. An analog or digital interface may be used to communicatively couple graphics subsystem 1915 and display 1920. For example, the interface may be any of a High-Definition Multimedia Interface, Display Port, wireless HDMI, and/or wireless HD compliant techniques. Graphics subsystem 1915 may be integrated into processor 1910 or chipset 1905. In some implementations, graphics subsystem 1915 may be a stand-alone card communicatively coupled to chipset 1905.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In various implementations, display 1920 may include any television type monitor or display. Display 1920 may include, for example, a computer display screen, touch screen display, video monitor, television-like device, and/or a television. Display 1920 may be digital and/or analog. In various implementations, display 1920 may be a holographic display. Also, display 1920 may be a transparent surface that may receive a visual projection. Such projections may convey various forms of information, images, and/or objects. For example, such projections may be a visual overlay for a mobile augmented reality (MAR) application. Under the control of one or more software applications 1916, platform 1902 may display user interface 1922 on display 1920.

In various implementations, content services device(s) 1930 may be hosted by any national, international and/or independent service and thus accessible to platform 1902 via the Internet, for example. Content services device(s) 1930 may be coupled to platform 1902 and/or to display 1920. Platform 1902 and/or content services device(s) 1930 may be coupled to a network 1960 to communicate (e.g., send and/or receive) media information to and from network 1960. Content delivery device(s) 1940 also may be coupled to platform 1902 and/or to display 1920.

In various implementations, content services device(s) 1930 may include a cable television box, personal computer, network, telephone, Internet enabled devices or appliance capable of delivering digital information and/or content, and any other similar device capable of unidirectionally or bidirectionally communicating content between content providers and platform 1902 and/display 1920, via network 1960 or directly. It will be appreciated that the content may be communicated unidirectionally and/or bidirectionally to and from any one of the components in system 1900 and a content provider via network 1960. Examples of content may include any media information including, for example, video, music, vehicle, security, medical, and gaming information, and so forth.

Content services device(s) 1930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1902 may receive control signals from navigation controller 1950 having one or more navigation features. The navigation features of controller 1950 may be used to interact with user interface 1922, for example. In implementations, navigation controller 1950 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1950 may be replicated on a display (e.g., display 1920) by movements of a pointer, cursor, focus ring, or other visual indicators displayed on the display. For example, under the control of software applications 1916, the navigation features located on navigation controller 1950 may be mapped to virtual navigation features displayed on user interface 1922, for example. In implementations, controller 1950 may not be a separate component but may be integrated into platform 1902 and/or display 1920. The present disclosure, however, is not limited to the elements or in the context shown or described herein.

In various implementations, drivers (not shown) may include technology to enable users to instantly turn on and off platform 1902 like a television with the touch of a button after initial boot-up, when enabled, for example. Program logic may allow platform 1902 to stream content to media adaptors or other content services device(s) 1930 or content delivery device(s) 1940 even when the platform is turned "off." In addition, chipset 1905 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1900 may be integrated. For example, platform 1902 and content services device(s) 1930 may be integrated, or platform 1902 and content delivery device(s) 1940 may be integrated, or platform 1902, content services device(s) 1930, and content delivery device(s) 1940 may be integrated, for example. In various implementations, platform 1902 and display 1920 may be an integrated unit. Display 1920 and content service device(s) 1930 may be integrated, or display 1920 and content delivery device(s) 1940 may be integrated, for example. These examples are not meant to limit the present disclosure.

In various implementations, system 1900 may be implemented as a wireless system, a wired system, or a combination of both. When implemented as a wireless system, system 1900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 19.

Figure 20:
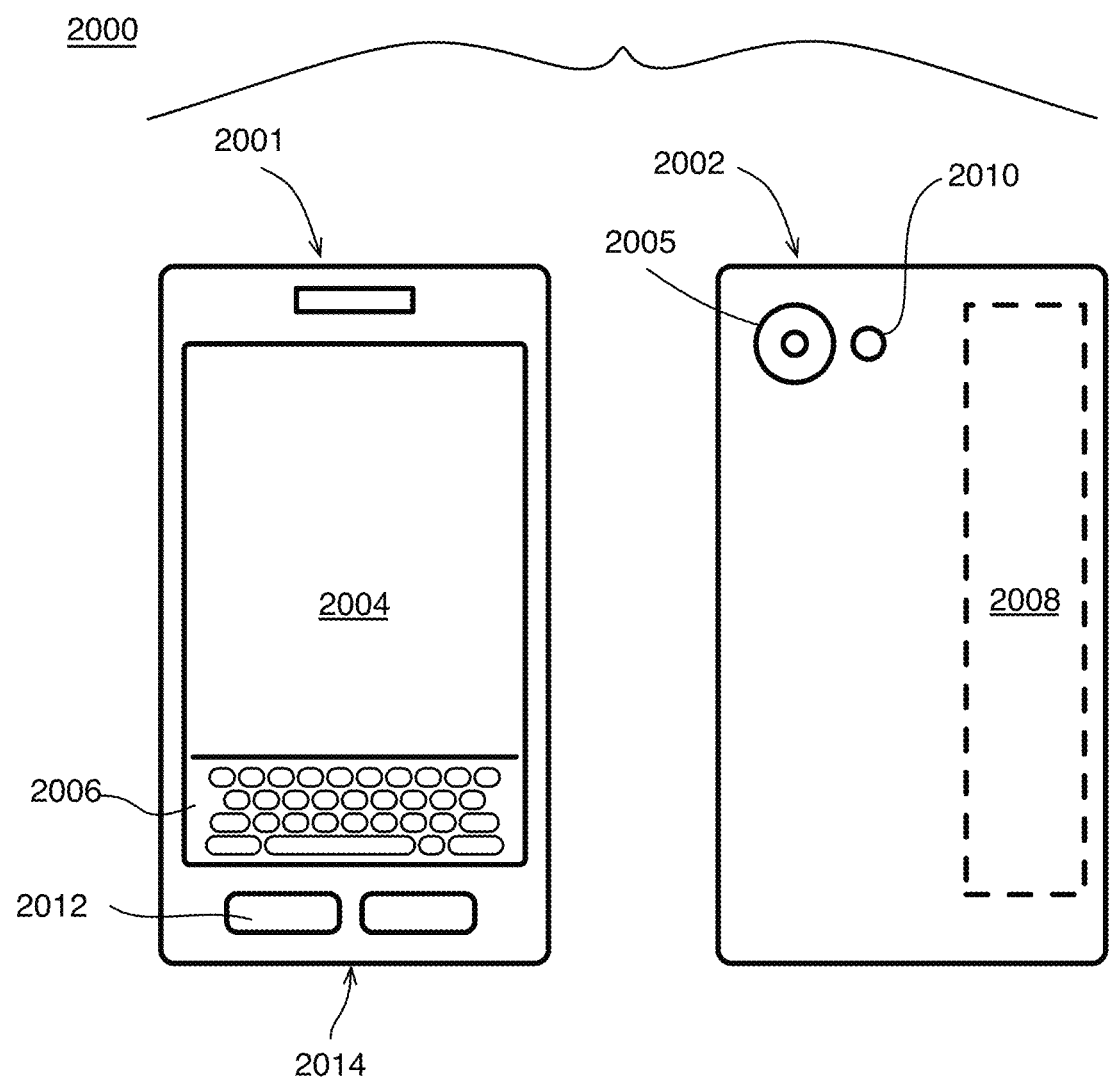
FIG. 20 illustrates another example device, all arranged in accordance with at least some implementations of the present disclosure.

Referring to FIG. 20, a small form factor device 2000 is one example of the varying physical styles or form factors in which systems 1800 or 1900 may be embodied. By this approach, device 2000 may be implemented as a mobile computing device having wireless capabilities. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 20, device 2000 may include a housing with a front 2001 and a back 2002. Device 2000 includes a display 2004, an input/output (I/O) device 2006, and an integrated antenna 2008. Device 2000 also may include navigation features 2012. I/O device 2006 may include any suitable I/O device for entering information into a mobile computing device. Examples for I/O device 2006 may include an alphanumeric keyboard, a numeric keypad, a touch pad, a touch sensitive screen, input keys, buttons, switches, microphones, speakers, voice recognition device and software, and so forth. Information also may be entered into device 2000 by way of one or more microphones 2014, or may be digitized by a voice recognition device. As shown, device 2000 may include a camera 2005 (e.g., including at least one fisheye or wide angle lens, aperture, and imaging sensor) and a flash 2010 integrated into back 2002 (or elsewhere) of device 2000. The implementations are not limited in this context.

Device 2000 could have both front and back cameras which could be used together to capture 360 degree images, and viewpoint shift information could be useful for artifact free stitching of the actual captured images from the multiple cameras into a single 360 degree image or omnidirectional 3D stereo image.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By an example one or more first implementations, a computer implemented method of image processing comprises receiving blocks of pixel image data of at least one input image; and storing at least one of the blocks on a cache, the storing comprising: overlaying the at least one block on a 2D map formed with an arrangement of tiles so that pixel locations of the at least one block are positioned over at least one of the tiles; storing at least part of the at least one block in at least one tile at one outer edge of the 2D map, and storing a portion of the at least one block that would extend outside of the one outer edge and storing the portion in one or more tiles at another outer edge of the 2D map without limiting available 2D rolling directions of an alignment from the one edge to the another edge.

By one or more second implementations, and further to the first implementation, wherein the storing is performed without the use of a predetermined tile order to store image data from the blocks.

By one or more third implementations, and further to the first or second implementation, wherein the tiles at the another edge are selected so that tiles from both the another edge and the one edge cooperatively provide a continuous conceptual surface that covers all pixel locations of the at least one block.

By one or more fourth implementations, and further to any of the first to third implementation, wherein a rolling direction of an alignment of tiles from the one edge to the another edge depends on a spatial general processing direction indicating an order of a sequence of the blocks on the image and as requested by an application to use the image data of the blocks to perform image processing.

By one or more fifth implementations, and further to the fourth implementation, wherein the blocks are positioned on the 2D map so that the spatial general processing direction extends continuously through and out of the 2D map at the one edge and back into the 2D map from the another edge in the same direction.

By one or more sixth implementations, and further to any of the first to fifth implementation, wherein the rolling direction is not limited to horizontal, vertical, and raster directions.

By one or more seventh implementations, and further to any of the first to sixth implementation, wherein the rolling direction is cooperatively available in 360 degrees on the 2D map while considering the origination of the rolling direction at tiles on all edges of the 2D map.

By one or more eighth implementations, and further to any of the first to seventh implementation, wherein the method comprising evicting image data of a previous block from the cache by overwriting the image data of the previous block only as tiles are needed to store one or more subsequent blocks along a spatial general processing direction on the 2D map regardless of the previous amount and timing of the use of the image data of the previous block in the tiles.

By one or more ninth implementations, and further to any of the first to eighth implementation, wherein the one or more tiles at the another edge are determined by using a tile virtual address and tile frame address of a previous tile storing the at least part of the at least one block and an initial tile frame-based address based on the at least one input image, wherein the initial tile frame-based address indicates a position outside of the 2D cache and associated with the portion of the at least one block.

By an example tenth implementation, a computer-implemented system of image processing comprises memory comprising at least one rolling cache with tiles arranged to form a 2D map; and at least one processor communicatively coupled to the memory and being arranged to operate by: receiving blocks of pixel image data of at least one input image; and storing at least one of the blocks on a cache, the storing comprising: overlaying the at least one block on the 2D map so that pixel locations of the at least one block are positioned over at least one of the tiles; storing at least part of the at least one block in at least one tile at one outer edge of the 2D map, and storing a portion of the at least one block that would extend outside of the one outer edge and storing the portion in one or more tiles at another outer edge of the 2D map without limiting the available 2D rolling directions of the alignment from the one edge to the another edge.

By one or more eleventh implementations, and further to the tenth implementation, wherein the at least one processor is arranged to operate by: storing blocks on the 2D map along a spatial general processing direction indicating an order of a sequence of the blocks on the image and as requested by an application to use the image data of the blocks to perform image processing, and determining which tiles at the another outer edge are to store the portion and depending on the spatial general processing direction.

By one or more twelfth implementations, and further to the eleventh implementation, wherein the at least one processor is arranged to operate by determining whether a cache hit exists wherein the storing of the blocks comprises storing a sequence of blocks each with a position requested by the application and relative to at least one previous block already stored on the 2D map.

By one or more thirteenth implementations, and further to the twelfth implementation, wherein the at least one processor is arranged to operate by determining whether a cache hit exists on at least one previous block already stored in the cache and overlapping the at least one block; and only storing one or more parts of the at least one block on the cache that do not overlap with the at least one previous block.

By one or more fourteenth implementations, and further to the twelfth implementation, wherein the at least one processor is arranged to operate by generating a block need table that lists pixel image data including pixel coordinates for individual previous blocks that are already stored in the cache, and to be compared to the pixel image data of the at least one block.

By one or more fifteenth implementations, and further to the fourteenth implementation, wherein tiles unavailable to store the at least one block are to be listed in a valid table.

By one or more sixteenth implementations, and further to any of the fifteenth implementation, wherein the tiles not listed as unavailable on the valid table are free to be used to store a current block.

By one or more example seventeenth implementations, a multi-directional rolling cache, comprising: tiles arranged to form a 2D map including at least a first outer edge and a second outer edge, wherein each tile is arranged to store pixel image data of one or more blocks forming an input image; and a cache manager arranged to store a portion of at least one block that would extend outside of the first outer edge and storing the portion in one or more roll tiles at the second outer edge without limiting available 2D rolling directions of a spatial alignment from the first outer edge to the second outer edge.

By one or more eighteenth implementations, and further to the seventeenth implementation, wherein determining a roll tile location on the 2D map comprises determining input image frame-based coordinates of a tile positioned to store the portion and determined by ignoring the edges.

By one or more nineteenth implementations, and further to the seventeenth or eighteenth implementation, wherein a roll tile location on the 2D map comprises computing an initial virtual address computed as a virtual address of a different tile storing another part of the at least one block plus a difference between frame-based tile addresses of the different tile and a tile positioned to store the portion and determined by ignoring the edges.

By one or more twentieth implementations, and further to the eighteenth implementation, wherein determining a roll tile location on the 2D map comprises subtracting the size of the 2D map of the cache from the initial virtual address.

By one or more example twenty-first implementations, at least one non-transitory computer-readable medium having instructions thereon that when executed cause a computing device to operate by: receiving blocks of pixel image data of an image; and storing at least part of at least one of the blocks on one or more tiles of a cache, the storing comprising: overlaying the at least one block on a 2D map formed with an arrangement of the tiles so that pixel locations of the at least one block are positioned over one of the tiles; storing at least part of the at least one block in at least one tile at one outer edge of the 2D map, and storing a portion of the at least one block that would extend beyond the one outer edge and storing the portion in one or more roll tiles at another edge of the 2D map geometrically aligned with the at least one tile at the one outer edge without limiting the available 2D rolling directions of the alignment from the one edge to the another edge.

By one or more twenty-second implementations, and further to the twenty-first implementation, wherein determining a roll tile location on the 2D map comprises determining input image frame-based coordinates of a tile positioned to store the portion and determined by ignoring the edges.

By one or more twenty-third implementations, and further to the twenty-second implementation, wherein the input image frame-based coordinates are an index of tiles on the entire input image and are determined as the closest keypoint on the tile to store the portion and relative to input image pixel coordinates within the portion.

By one or more twenty-fourth implementations, and further to the twenty-first implementation, wherein determining a roll tile location of the 2D map comprises computing an initial virtual address computed as a virtual address of a different tile storing another part of the at least one block plus a difference between frame-based tile addresses of the different tile and a tile positioned to store the portion and determined by ignoring the edges.

By one or more twenty-fifth implementations, and further to the twenty-fourth implementation, wherein determining a roll tile location on the 2D map comprises subtracting a size of the 2D map of the cache from the initial virtual address.

In a twenty-sixth example, at least one machine readable medium may include a plurality of instructions that in response to being executed on a computing device, causes the computing device to perform the method according to any one of the above examples.

In a twenty-seventh example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer implemented method of image processing, the method comprising:
    receiving blocks of pixel image data of at least one input image; and storing at least one block of the blocks in a cache, the storing including:
overlaying the at least one block on a 2D map formed with an arrangement of tiles in which pixel locations of the at least one block are positioned over at least one of the tiles;
storing at least part of the at least one block in at least one tile at one outer edge of the 2D map; and
storing a portion of the at least one block that would extend outside of the one outer edge and storing the portion in one or more tiles at another outer edge of the 2D map without limiting available 2D rolling directions of an alignment from the one outer edge to the another outer edge.

2. The method of claim 1, wherein the storing is performed without use of a predetermined tile order to store image data from the blocks.

3. The method of claim 1, wherein the tiles at the another outer edge are selected so that tiles from both the another outer edge and the one outer edge cooperatively provide a continuous conceptual surface that covers all pixel locations of the at least one block.

4. The method of claim 1, wherein a rolling direction of an alignment of tiles from the one outer edge to the another outer edge depends on a spatial general processing direction indicating an order of a sequence of the blocks on the image and as requested by an application to use the image data of the blocks to perform image processing.

5. The method of claim 4, wherein the blocks are positioned on the 2D map so that the spatial general processing direction extends continuously through and out of the 2D map at the one outer edge and back into the 2D map from the another outer edge in a same direction.

6. The method of claim 4, wherein the rolling direction is not limited to horizontal, vertical, and raster directions.

7. The method of claim 4, wherein the rolling direction is cooperatively available in 360 degrees on the 2D map while considering the origination of the rolling direction at tiles on all edges of the 2D map.

8. The method of claim 1, including evicting image data of a previous block from the cache by overwriting the image data of the previous block as tiles are needed to store one or more subsequent blocks along a spatial general processing direction on the 2D map regardless of a previous amount and timing of use of the image data of the previous block in the tiles.

9. The method of claim 1, wherein the one or more tiles at the another outer edge are determined by using a tile virtual address and tile frame address of a previous tile storing the at least part of the at least one block and an initial tile frame-based address based on the at least one input image, wherein the initial tile frame-based address indicates a position outside of the cache and associated with the portion of the at least one block.

10. A computer-implemented system of image processing, the system comprising:
memory including at least one rolling cache with tiles arranged to form a 2D map; and
at least one processor communicatively coupled to the memory and being arranged to:
receive blocks of pixel image data of at least one input image; and
store at least one block of the blocks in the at least one rolling cache by:
overlay the at least one block on the 2D map so that pixel locations of the at least one block are positioned over at least one of the tiles;
store at least part of the at least one block in at least one tile at one outer edge of the 2D map; and
store a portion of the at least one block that would extend outside of the one outer edge and store the portion in one or more tiles at another outer edge of the 2D map without limiting available 2D rolling directions of alignment from the one outer edge to the another outer edge.

11. The system of claim 10, wherein the at least one processor is arranged to:
store blocks on the 2D map along a spatial general processing direction indicating an order of a sequence of the blocks on the image and as requested by an application to use the image data of the blocks to perform image processing, and
determine, based on the spatial general processing direction, which tiles at the another outer edge are to store the portion.

12. The system of claim 11, wherein the at least one processor is arranged to:
determine whether a cache hit exists; and
store a sequence of blocks each with a position requested by the application and relative to at least one previous block already stored on the 2D map.

13. The system of claim 12, wherein the at least one processor is arranged to:
determine whether a cache hit exists on at least one previous block already stored in the cache and overlapping the at least one block; and
store one or more parts of the at least one block in the cache that do not overlap with the at least one previous block.

14. The system of claim 12, wherein the at least one processor is arranged to generate a block need table that lists pixel image data including pixel coordinates for individual previous blocks that are already stored in the cache, and to be compared to the pixel image data of the at least one block.

15. The system of claim 14, wherein tiles unavailable to store the at least one block are to be listed in a valid table.

16. The system of claim 15, wherein the tiles not listed on the valid table are free to be used to store a current block.

17. A multi-directional rolling cache comprising:
tiles arranged to form a 2D map including at least a first outer edge and a second outer edge, wherein each tile is arranged to store pixel image data of one or more blocks forming an input image; and
a cache manager arranged to store a portion of at least one block that would extend outside of the first outer edge and store the portion in one or more roll tiles at the second outer edge without limiting available 2D rolling directions of a spatial alignment from the first outer edge to the second outer edge.

18. The rolling cache of claim 17, wherein the cache manager is to determine a roll tile location on the 2D map by determining input image frame-based coordinates of a tile positioned to store the portion and determined by ignoring the edges.

19. The rolling cache of claim 17, wherein a roll tile location on the 2D map is based on an initial virtual address computed as a virtual address of a different tile storing another part of the at least one block plus a difference between frame-based tile addresses of the different tile and a tile positioned to store the portion and determined by ignoring the edges.

20. The rolling cache of claim 19, wherein the cache manager is to determine the roll tile location on the 2D map by subtracting a size of the 2D map of the cache from the initial virtual address.

21. At least one non-transitory computer-readable medium comprising instructions thereon to cause a computing device to at least:
receive blocks of pixel image data of an image; and
store at least part of at least one block of the blocks in one or more tiles of a cache by:
overlaying the at least one block on a 2D map formed with an arrangement of the tiles in which pixel locations of the at least one block are positioned over one of the tiles;
storing at least part of the at least one block in at least one tile at one outer edge of the 2D map; and
storing a portion of the at least one block that would extend beyond the one outer edge and storing the portion in one or more roll tiles at another edge of the 2D map geometrically aligned with the at least one tile at the one outer edge without limiting available 2D rolling directions of alignment from the one outer edge to the another edge.

22. The medium of claim 21, wherein the instructions are to cause the computing device to determine a roll tile location on the 2D map by determining input image frame-based coordinates of a tile positioned to store the portion and determined by ignoring the edges.

23. The medium of claim 22, wherein the input image frame-based coordinates are an index of tiles on the entire input image and are determined as a closest keypoint on the tile to store the portion and relative to input image pixel coordinates within the portion.

24. The medium of claim 21, wherein the instructions are to cause the computing device to determine a roll tile location of the 2D map by computing an initial virtual address computed as a virtual address of a different tile storing another part of the at least one block plus a difference between frame-based tile addresses of the different tile and a tile positioned to store the portion and determined by ignoring the edges.

25. The medium of claim 24 wherein the instructions are to cause the computing device to determine the roll tile location on the 2D map by subtracting a size of the 2D map of the cache from the initial virtual address.

* * * * *